US006477206B1

(12) United States Patent
Chatani

(10) Patent No.: US 6,477,206 B1
(45) Date of Patent: Nov. 5, 2002

(54) APPARATUS FOR AND METHOD OF RECEIVING INFORMATION, SYSTEM FOR RECEIVING INFORMATION, APPARATUS FOR AND METHOD OF SENDING INFORMATION, AND SYSTEM FOR SENDING AND RECEIVING INFORMATION

(75) Inventor: Masayuki Chatani, Tokyo (JP)

(73) Assignee: Sony Computer Entertainment Inc., Tokyo (JP)

(*) Notice: Subject to any disclaimer, the term of this patent is extended or adjusted under 35 U.S.C. 154(b) by 0 days.

(21) Appl. No.: 09/364,640

(22) Filed: Jul. 30, 1999

(30) Foreign Application Priority Data

Jul. 31, 1998 (JP) .......................................... 10-218298

(51) Int. Cl.$^7$ ............................................ H04L 29/12

(52) U.S. Cl. ....................... 375/260; 375/316; 370/394; 370/474

(58) Field of Search ................................ 375/260, 295, 375/299, 316, 356, 365; 370/393, 394, 471, 473, 474, 479, 458, 503, 509, 510, 512; 455/500, 502, 517, 556

(56) References Cited

U.S. PATENT DOCUMENTS 5,065,398 A * 11/1991 Takashima .................. 370/230
5,757,367 A 5/1998 Kapoor
6,327,480 B1 * 12/2001 Miki .......................... 370/473
6,359,877 B1 * 3/2002 Rathonyi et al. ........... 370/232

FOREIGN PATENT DOCUMENTS

| | | |
|---|---|---|
| EP | 0 031 136 | 7/1981 |
| EP | 0 186 343 | 7/1986 |
| EP | 0 213 682 | 3/1987 |
| EP | 0 234 859 | 9/1987 |
| GB | 2 285 554 | 7/1995 |
| GB | 2 291 523 | 1/1996 |
| GB | 2 317 481 | 3/1998 |
| WO | WO 98 32307 | 7/1998 |

OTHER PUBLICATIONS

European Telecommunications Standards Institute: "European Radio Message System (ERMES)", European Telecommunication Standard, Jul. 1992, vol. ETS300, No. 133/134, pp. 1–5, 7–40, XP002087657.
Minami, Y. et al.: "Alphanumeric Pager Using European Radio Message System", NEC Research and Development, JP, Nippon Electric LTR., Tokyo, vol. 35, No. 1, pp. 62–69, XP000443435.

* cited by examiner

*Primary Examiner*—Chi Pham
*Assistant Examiner*—Khanh Cong Tran
(74) *Attorney, Agent, or Firm*—Frommer Lawrence & Haug LLP; William S. Frommer; Hans R. Mahr

(57) ABSTRACT

A system for sending and receiving information is capable of sending and receiving a large amount of data. A CPU of a portable computer has an identification code comparator for comparing an identification code preset by a video game machine with an identification code added to a received data string, and a readout controller having a selective reception function to selectively receive the data string depending on a compared result from the identification code comparator.

23 Claims, 26 Drawing Sheets

APPARATUS FOR AND METHOD OF RECEIVING INFORMATION, SYSTEM FOR RECEIVING INFORMATION, APPARATUS FOR AND METHOD OF SENDING INFORMATION, AND SYSTEM FOR SENDING AND RECEIVING INFORMATION

BACKGROUND OF THE INVENTION

1. Field of the Invention

The present invention relates to an apparatus for and a method of receiving information as data which have been sent, a system for receiving information as data which have been sent, an apparatus for and a method of sending information as data, and a system for sending information as data from a sending apparatus and receiving information as data with a receiving apparatus.

2. Description of the Related Art

There have been proposed portable information receiving apparatus capable of receiving various items of information broadcast by radio pager systems and radio broadcasting systems. For example, such portable information receiving apparatus include so-called pagers or beepers, and are capable of receiving various information distribution services for distributing weather information, event information, etc.

In radio pager data sending and receiving systems, it is possible to send a plurality of types of data at the same time, i.e., to send many different data parallel to each other. For example, radio pager data sending and receiving systems are able to send and receive different types of data parallel to each other, i.e., to send and receive different data in a multiplex fashion.

For example, a radio pager data sending and receiving system which has pagers as reception terminals is capable of storing a plurality of types of data corresponding to pagers with different addresses and sending the stored data as parallel data to the pagers.

In recent years, a large amount of data is transmitted in radio pager data sending and receiving systems. However, a single unit for data transmission in the conventional radio pager data sending and receiving systems is limited. For example, since data to be sent need to be completely sent within one data transmission cycle, the amount of data that can be sent in such a data transmission cycle is limited.

SUMMARY OF THE INVENTION

It is therefore an object of the present invention to provide an apparatus for and a method of receiving information, a system for receiving information, an apparatus for and a method of sending information, and a system for sending and receiving information, which are capable of sending and receiving a large amount of data.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

Figure 1:
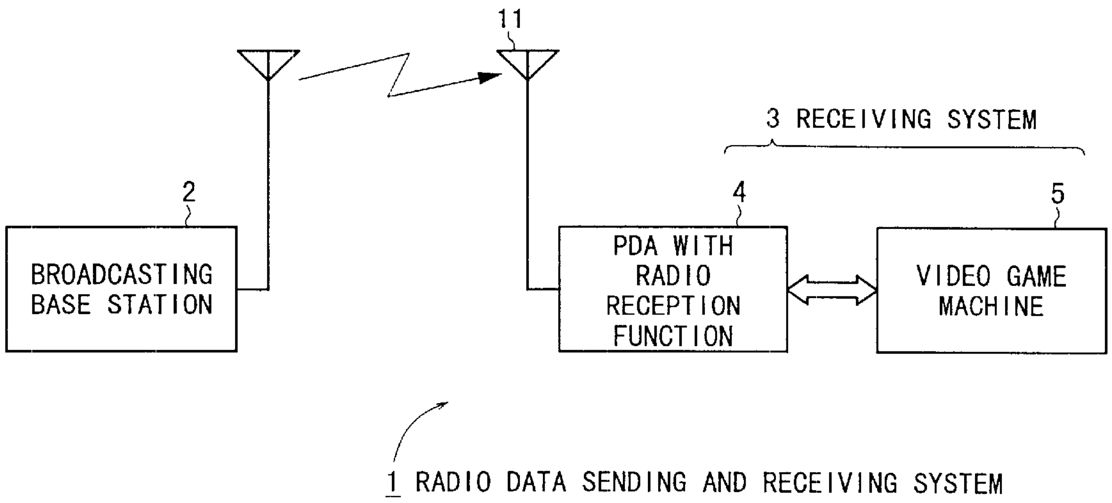
FIG. 1 is a block diagram of a radio data sending and receiving system according to the present invention.

In the illustrated embodiment, as shown in FIG. 1, the principles of the invention are applied to a radio data sending and receiving system 1 having a function to receive data that are sent intermittently and repeatedly thereto.

As shown in FIG. 1, the radio data sending and receiving system 1 comprises a broadcasting base station 2 as a sending means for sending radio data intermittently and repeatedly, and a receiving system 3 as a receiving means for receiving radio data sent from the broadcasting base station 2.

In the radio data sending and receiving system 1, the receiving system 3 comprises a portable computer 4 functioning as a second data processing means and also as a selective receiving means for receiving radio data broadcast from the broadcasting base station 2, and a video game machine 5 functioning as a first data processing means and also as a restoring means, to which the portable computer 4 can be connected, for using radio data received by the portable computer 4. The video game machine 5 is arranged as a video entertainment apparatus for executing program data recorded in a recording medium to play a video game or the like, and portable computer 4 is arranged as a portable information communication terminal or a personal digital assistant (PDA) with a radio reception function. The portable computer 4 may also have a function as a data restoring means.

Figure 2:
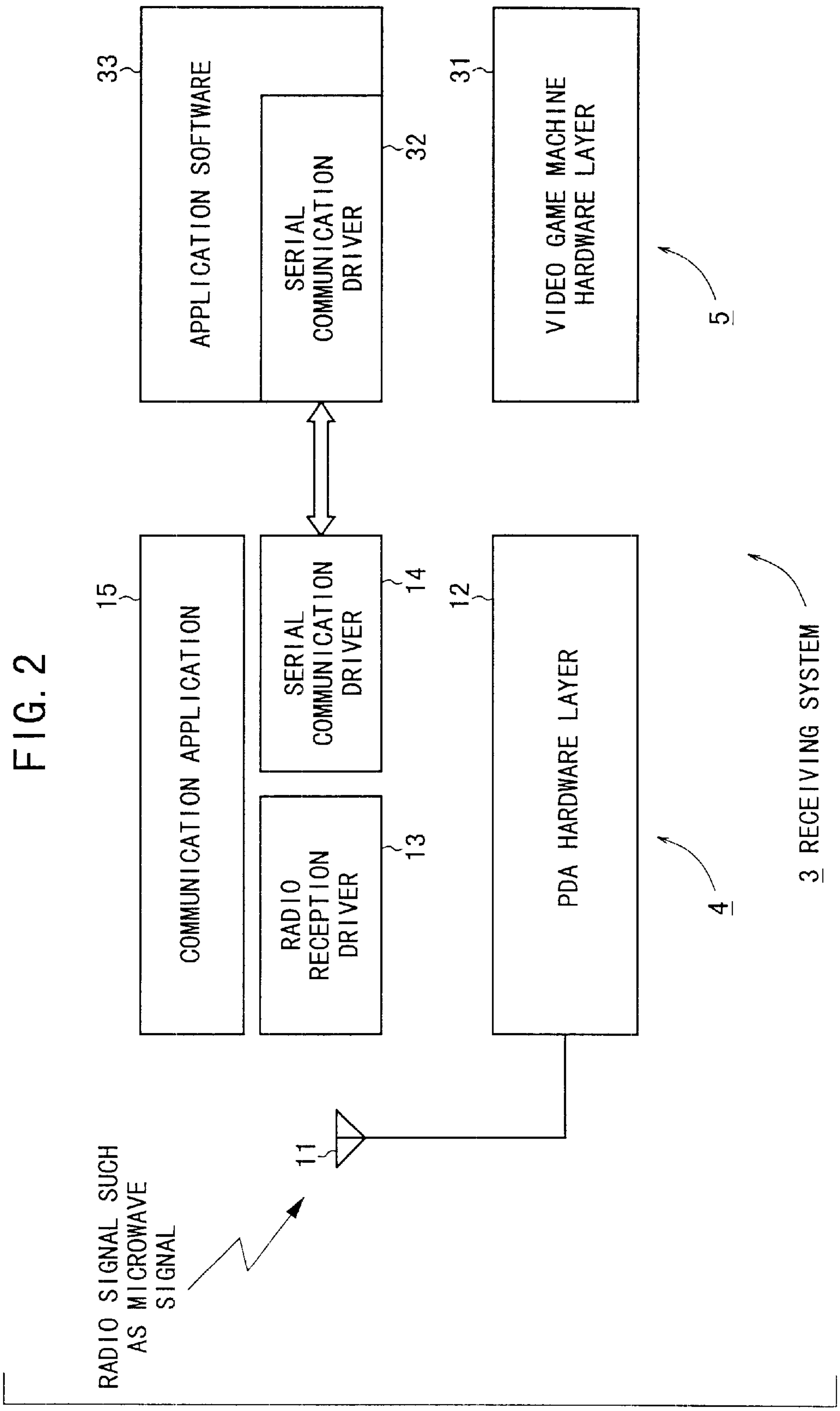
FIG. 2 is a block diagram of a receiving system of the radio data sending and receiving system shown in FIG. 1.

As shown in FIG. 2, the portable computer 4 comprises a PDA hardware layer 12 for processing data received by an antenna 11 and a software layer for performing a communication process in the PDA hardware layer 12, the software layer comprising a radio communication driver (radio reception driver) 13, a serial communication driver 14, and a communication application 15.

Figure 3:
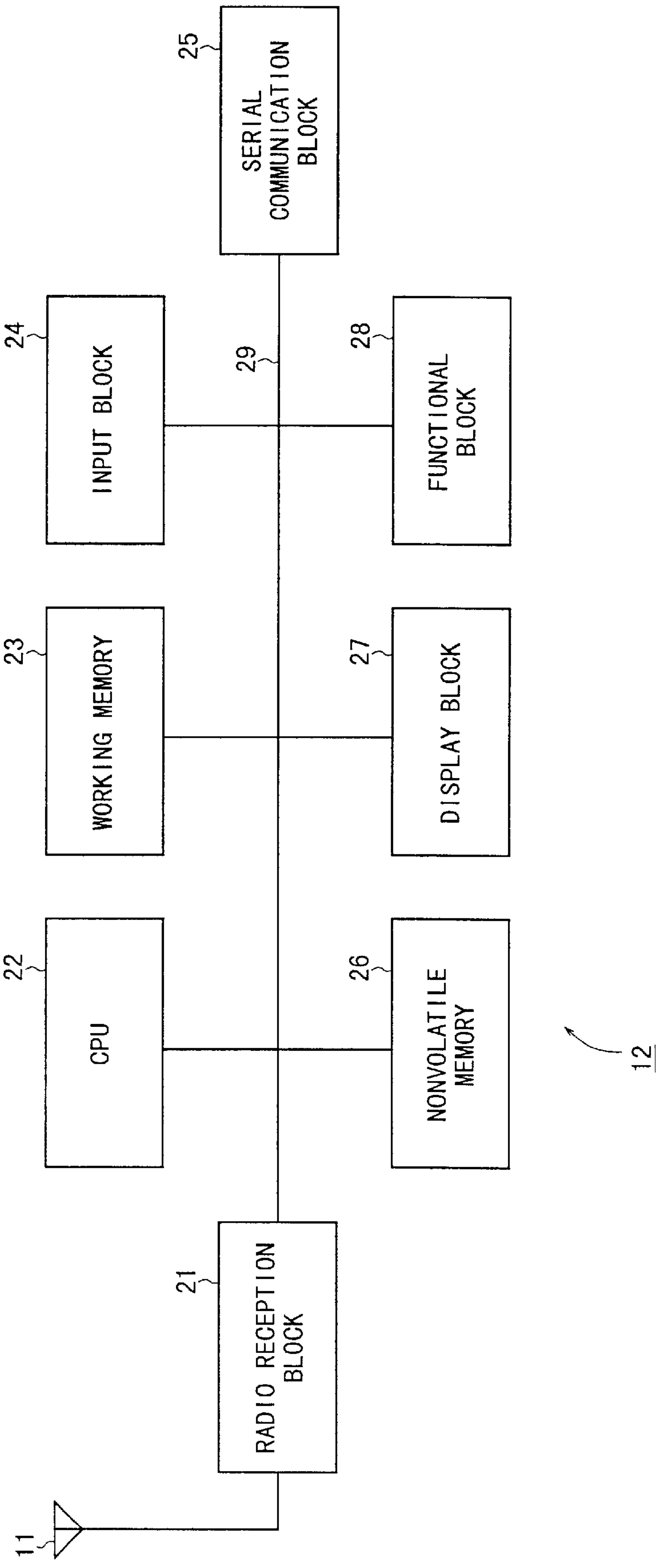
FIG. 3 is a block diagram of a portable computer of the receiving system shown in FIG. 2.

As shown in FIG. 3, the PDA hardware layer 12 comprises a radio reception block 21, a CPU 22, a working memory 23, an input block 24, a serial communication block 25, a non-volatile memory 26, a display block 27, and a functional block 28. These components of the PDA hardware layer 12 are connected to a bus 29.

As shown in FIG. 2, the video game machine 5 comprises a video game machine hardware layer 31 and a software layer for controlling the video game machine hardware layer 31, the software layer comprising application software 33 and a serial communication driver 32 included in the application software 33.

Figure 4:
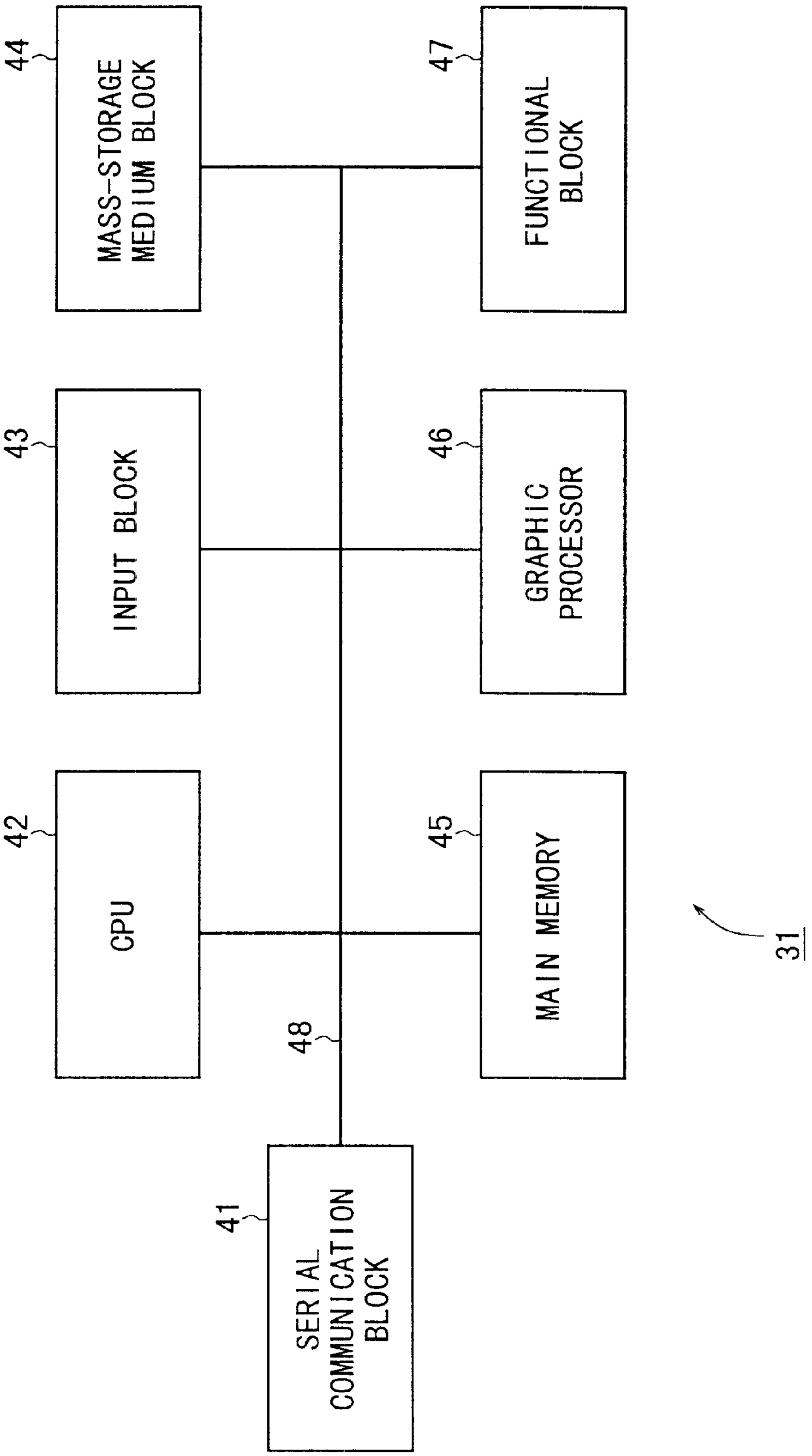
FIG. 4 is a block diagram of a video game machine of the receiving system shown in FIG. 2.

As shown in FIG. 4, the video game machine hardware layer 31 comprises a serial communication block 41, a CPU 42, an input block 43, a mass-storage medium block 44, a main memory 45, a graphic processor 46, and a functional block 47. These components of the video game machine hardware layer 31 are connected to a bus 48.

Figure 5:
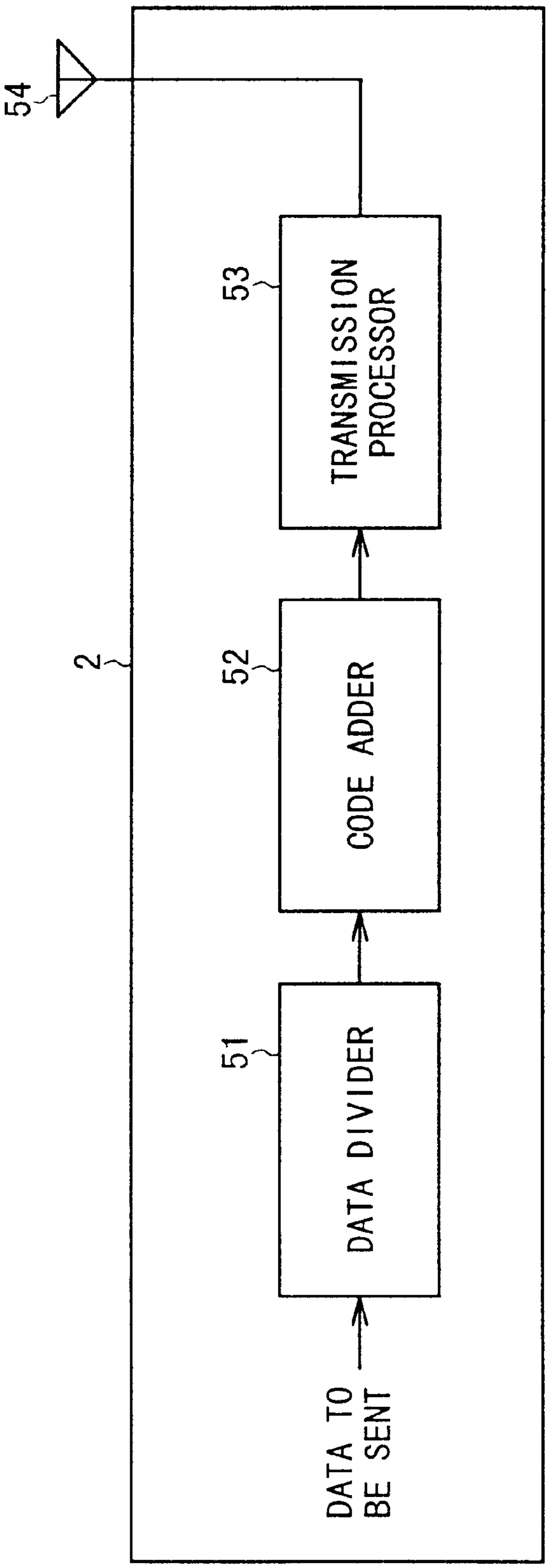
FIG. 5 is a block diagram of a broadcasting base station of the radio data sending and receiving system shown in FIG. 1.

As shown in FIG. 5, the broadcasting base station 2 for sending data to the receiving system 3 comprises a data divider 51 as a data dividing means for dividing data to be sent into. data division units thereby to produce divided data, a code adder 52 serving a function as an identification information adding means for adding an identification code as identification information to identify data to be sent to respective divided data, a function as a sequence information adding means for adding sequence codes as sequence information to respective divided data in the sequence in which the data are divided, and a function as a total-number-of-divisions information adding means for adding a total number code as total-number-of-divisions information to the divided data, and a transmission processor 53 as a transmission processing means for allotting the divided data to data sending cycles and sending the divided data via an antenna 54.

The data divider 51 divides inputted data to be sent into data division units which are units that can be sent. The data to be sent which have been divided by the data divider 51 are then supplied to the code adder 52.

The code adder 52 adds sequence codes, an identification code, and a total-number-of-divisions code to the divided data. The sequence codes comprise successive numbers from 0 that are added to the divided data. The identification code represents information indicative of the type of divided data of the same data to be sent. The total-number-of-divisions code represents information indicative of the total number of divisions of the data to be sent. The divided data to which the above codes are added are supplied to the transmission processor 53.

The transmission processor 53 processes the data to be sent to which the codes are added for transmission. Specifically, the transmission processor 53 allots the divided data to respective data storage areas of a data transmission cycle where the data storage areas serve as transmission units, and transmits the divided data.

Figure 6:
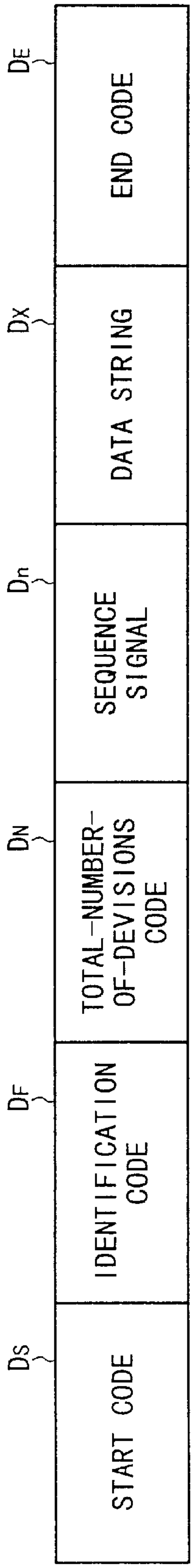
FIG. 6 is a diagram showing a data format for data sent and received between the receiving system and the broadcasting base station.

The broadcasting base station 2 processes the data to be sent and sends the data in the manner described above. Specifically, as shown in FIG. 6, the broadcasting base station 2 sends data in a data format which includes a start code $D_S$, an identification code $D_F$ as identification information, a total-number-of-divisions code $D_N$, a sequence code $D_n$ as sequence information, a data string $D_X$, and an end code $D_E$. The data format is arranged as a packet, and the various codes added to the data string $D_X$ are added by the code adder 52.

The data string $D_X$ represents a body of data. Specifically, if data to be sent exceed a data transmission unit, then the data string $D_X$ comprises data divided from the data to be sent.

The start code $D_S$ comprises information indicative of the start of each data transmission unit. The end code $D_E$ comprises information indicative of the end of each data transmission unit.

The identification code $D_F$ comprises information indicative of the type of the data string $D_X$. Specifically, insofar as the identification codes $D_F$ of data strings $D_X$ are the same, the data strings $D_X$ to which the same identification code $D_F$ is added are the divided data produced from the same data to be sent.

The total-number-of-divisions code $D_N$ comprises information indicative of the total number of data transmission units having the same identification code. For example, if data to be sent exceed a data transmission unit, then the total-number-of-divisions code $D_N$ represents the number of divisions produced by dividing the data to be sent.

The sequence code $D_n$ comprises information indicative of the position of a data transmission unit in a group of data. For example, when divided data that have been sent are to be restored, the sequence code $D_n$ is used to indicate a sequence according to which the data strings $D_X$ are to be combined.

When data are sent in the above data format to the receiving system 3, the portable computer 4 selectively receives the data based on the identification codes $D_F$, and the video game machine 5 combines the data strings $D_X$ in the received data based on the sequence codes $D_n$ in the selectively received data for thereby restoring the sent data.

The various codes added to the data string $D_X$ are not limited to being sent successively together as shown in FIG. 6, as described later on.

The components of the portable computer 4 and the video game machine 5 of the receiving system 3 will be described in detail below.

In the portable computer 4, the radio reception block 21 receives data sent in the form of a radio signal such as a microwave signal via the antenna 11. The radio reception block 21 is controlled for data reception by the radio reception driver 13 which comprises a program, shown in FIG. 2.

Figure 7:
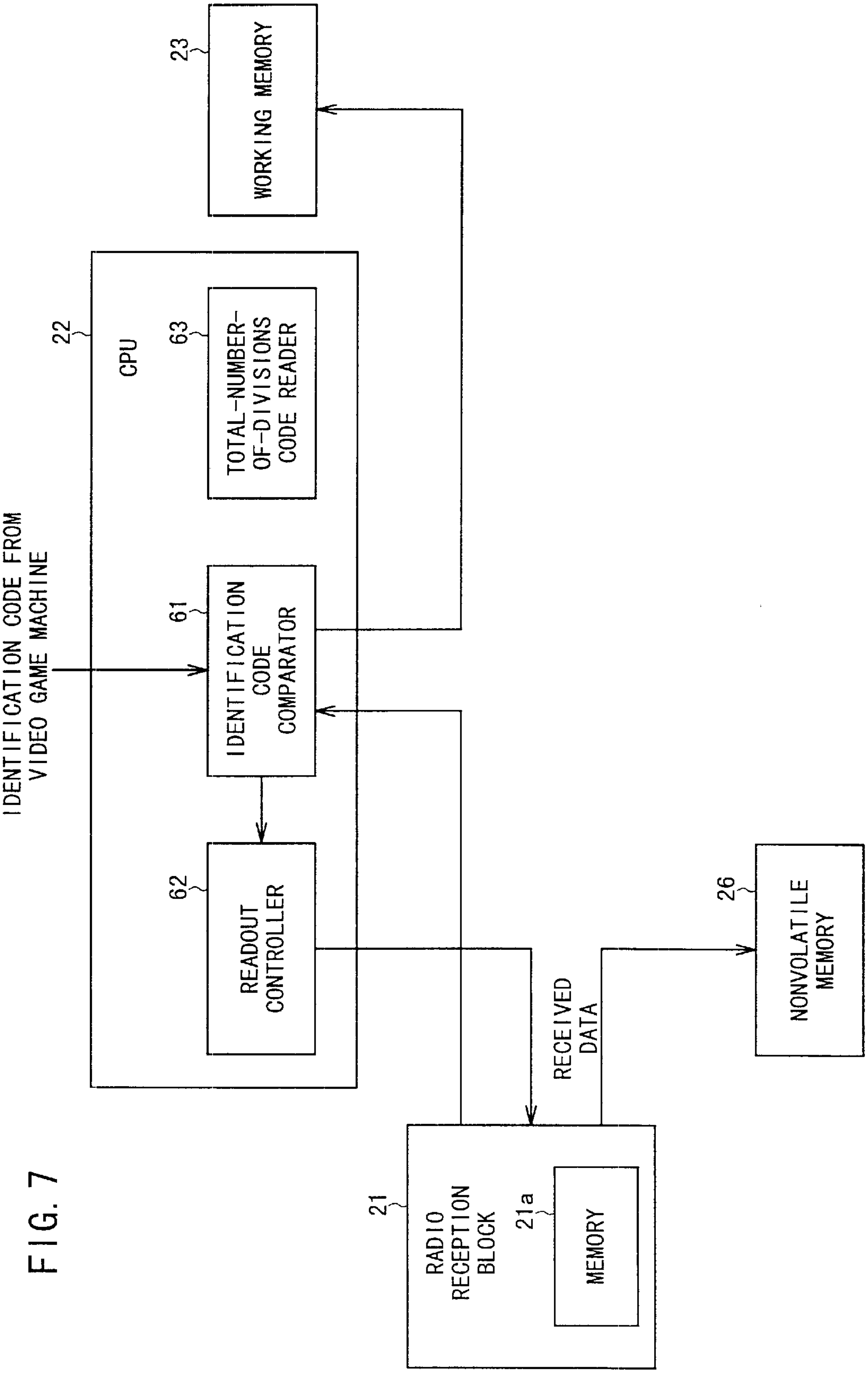
FIG. 7 is a block diagram of a portion of the portable computer.

As shown in FIG. 7, the radio reception block 21 has a memory 21*a* as a memory means for temporarily storing data broadcast from the broadcasting base station 2. The portable computer 4 can selectively receive the data based on information added to the data that have been received and temporarily stored in the radio reception block 21. Specifically, when n the portable computer 4 selectively receives the data, the data temporarily stored in the radio reception block 21 are read into the nonvolatile memory 26.

The working memory 23 serves as a memory means for use as a working area for various data.

The input block 24 is arranged to function as a manual input controller. Therefore, the input block 24 allows the user to enter various items of information into the portable computer 4.

The nonvolatile memory 26 serves as a memory means for storing various data. The nonvolatile memory 26 stores data received via the antenna 11 and data sent from the video game machine 5 via the serial communication block 25.

The display block 27 is arranged to function as a display unit for displaying various items of information. The display block 27 displays various character information and image information on a liquid crystal panel (not shown), for example.

The serial communication block 25 has a function to effect serial communications with an external device. The serial communication block 25 is electrically connectable to the serial communication block 41 of the video game machine 5, for example, for data communications with the video game machine 5. The serial communication block 25 is controlled for its communications by the serial communication driver 14.

The functional block 28 is arranged to perform other functions than the above blocks, and may comprise, for example, a power supply block, for example.

The CPU 22 has a function to control the above blocks. For example, the CPU 22 controls the blocks according to various programs, such as the communication application 15, etc. of the above software layer.

As shown in FIG. 7, the CPU 22 comprises an identification code comparator 61 as a comparing means for comparing an identification code preset by the video game machine 5 with an identification code $D_F$ added to a received data string $D_X$, a readout controller 62 having a selective reception function to selectively receive the data string $D_X$ depending on a compared result from the identification code comparator 61, and a total-number-of-divisions code reader 63 for reading a total-number-of -divisions code $D_N$ representing total-number-of-divisions information added to the received data string $D_X$.

The CPU 22 operates as follows: The identification code comparator 61 compares an identification code $D_F$ in data received by the radio reception block 21 with a present identification code sent from the video game machine 5. If the compared identification codes agree with each other, then the readout controller 62 selectively reads the received data to which the identification code $D_F$ is added from the memory 21*a* of the radio reception block 21, and stores the data into the nonvolatile memory 26. The received data are data received by the portable computer 4 and have the data format shown in FIG. 6.

The CPU 22 also has a function to determine a sequence code $D_n$ added to a received data string $D_X$. Specifically, the CPU 22 decides whether a sequence code $D_n$ added to a presently received data string $D_X$ agrees with a sequence code $D_n$ added to a previously received data string $D_X$.

The total-number-of-divisions code reader 63 reads a total-number-of-divisions code $D_N$ added to a data string $D_X$ to obtain information indicating that all divided data of data to be sent have been received.

The portable computer 4 thus constructed is capable of receiving data that are sent intermittently and repeatedly. The portable computer 4 is removably connected to the video game machine 5, and is compatible with a memory card system that is also removably connectable to the video game machine 5.

The input block 43 of the video game machine 5 is arranged to function as a manual input controller. Therefore, the input block 43 allows the user to enter various items of information into the video game machine 5.

The main memory 45 serves as a memory means for storing various data. The main memory 45 stores the application software 33 of the software layer, for example. The main memory 45 also stores data sent from the portable computer 4 via the serial communication block 41 which serves as a communication means for receiving divided data.

The graphic processor 46 serves as a processor for effecting image processing on entered data. Specifically, the graphic processor 46 effects graphic processing on images to be displayed on a display unit (not shown). More specifically, the graphic processor 46 performs a polygon graphic processing process.

The mass-storage medium block 44 is a block for reading various data recorded in a mass-storage medium which may be a CD-ROM or the like, for example.

The serial communication block 41 serves a function to effect serial communications with an external device. The serial communication block 41 is electrically connectable to the serial communication block 25 of the portable computer 4, for example, so that the video game machine 5 can perform data communications with the portable computer 4. The serial communication block 41 is controlled for its communications by the serial communication driver 32 included in the application software 33.

The functional block 47 is arranged to perform other functions than the above blocks, and may comprise, for example, a power supply block and a connection block for connection to a memory card system as a recording medium.

The CPU 42 has a function to control the above blocks. For example, the CPU 42 controls the blocks according to various programs, such as the application software 33, etc. of the above software layer.

Figure 8:
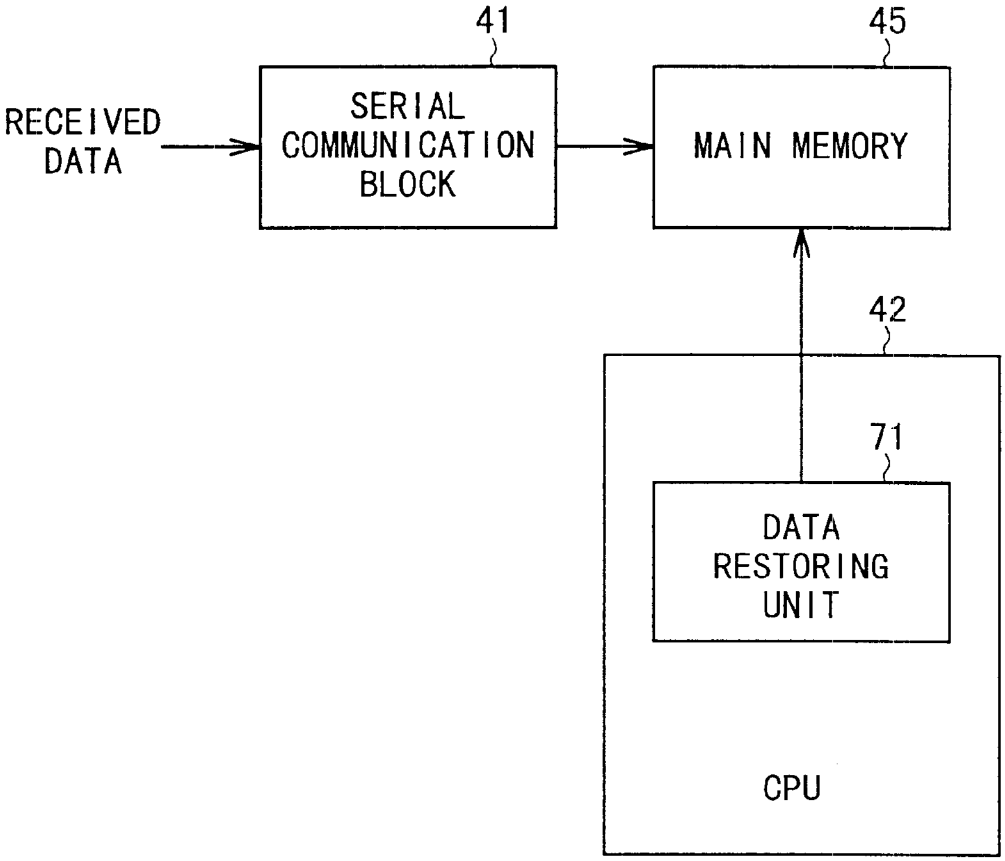
FIG. 8 is a block diagram of a portion of the video game machine.

As shown in FIG. 8, the CPU 42 has a data restoring unit 71 for restoring data based on the sequence codes $D_n$ added to data strings $D_X$. The data restoring unit 71 combines the data strings $D_X$ sent from the serial communication block 41 and stored in the main memory 45 based on the sequence codes $D_n$ for thereby restoring the original data.

The video game machine 5 thus constructed is capable of is playing a video game based on a program recorded in the mass-storage medium such as a CD-ROM or the like. The video game machine 5 allows the memory card system to be removably connected thereto.

The portable computer 4 is removably connectable to the video game machine 5, and can perform data communications with the portable computer 4.

A process of receiving radio data with the receiving system 3 will be described below.

Figure 9:
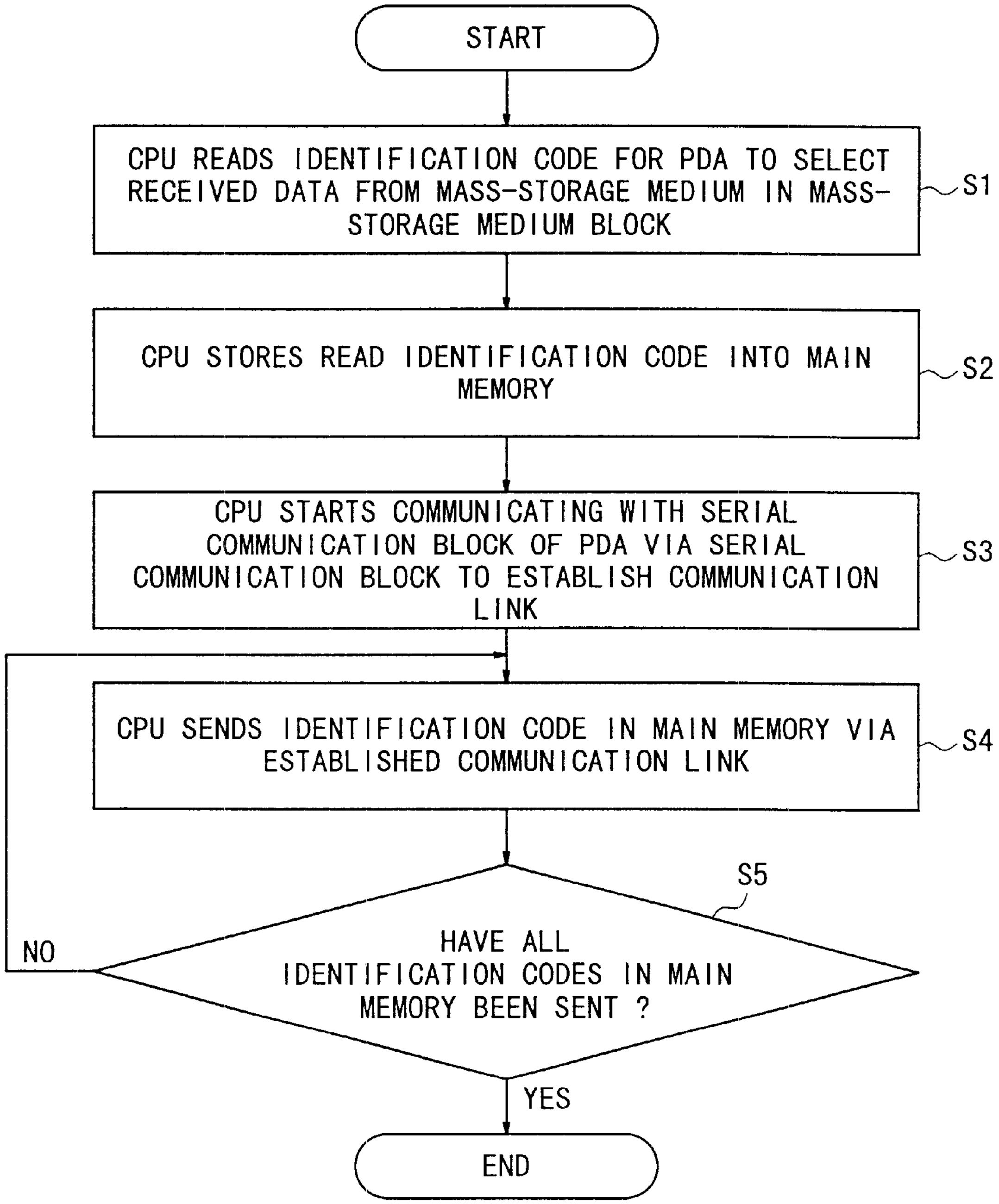
FIG. 9 is a flowchart of a processing sequence of the video game machine in a process of sending identification codes for selectively receiving data from the video game machine to the portable computer until the identification codes are set in the portable computer.
Figure 10:
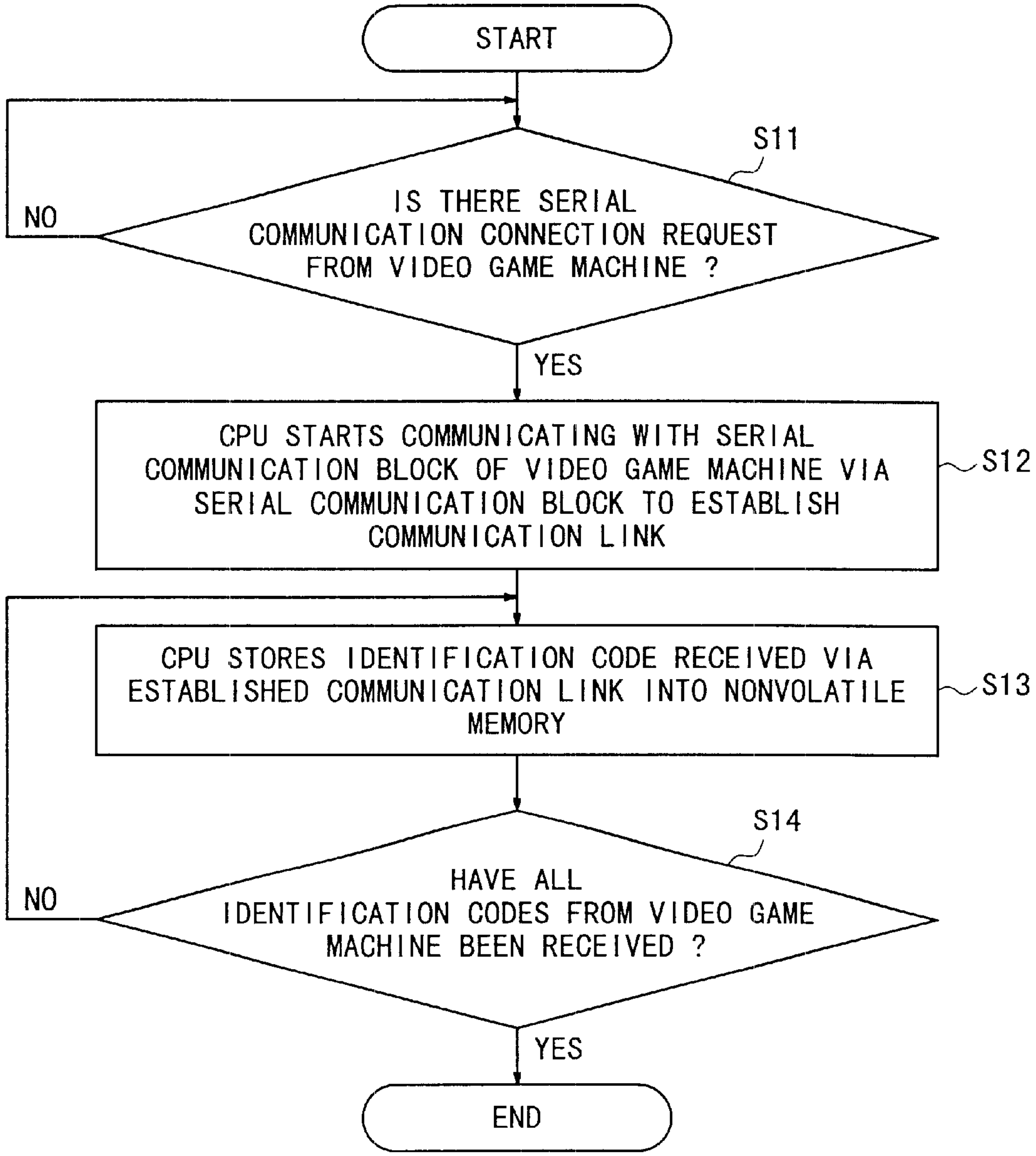
FIG. 10 is a flowchart of a processing sequence of the portable computer in the process of sending identification codes for selectively receiving data from the video game machine to the portable computer until the identification codes are set in the portable computer.

FIGS. 9 and 10 show a process in which the video game machine 5 sends identification codes to the portable computer 4 for selectively receiving data until the identification codes are set in the portable computer 4. FIG. 9 shows a processing sequence of the video game machine 5, and FIG. 10 shows a processing sequence of the portable computer 4.

As shown in FIG. 9, the CPU 42 of the video game machine 5 reads identification codes for enabling the portable computer (PDA) 4 to select received data from the mass-storage medium in the mass-storage medium block 44 in step S1.

In step S2, the CPU 42 stores the read identification codes into the main memory 45.

Then, the CPU 42 starts communicating with the serial communication block 25 of the portable computer 4 via the serial communication block 41 to establish a communication link therewith in step S3. Thereafter, the CPU 42 sends the identification codes stored in the main memory 45 to the portable computer 4 via the established communication link in step S4.

To confirm the end of the transmission of the identification codes, the CPU 42 decides whether all the identification codes in the main memory 45 have been sent or not in step S5. If the CPU 42 confirms that all the identification codes in the main memory 45 have been sent, then the video game machine 5 finishes the process of sending the identification codes. If the CPU 42 confirms that all the identification codes in the main memory 45 have not been sent, then the video game machine 5 executes the processing from step S4 again.

Concurrent with the above process carried out by the video game machine 5, the portable computer 4 decides whether there is a serial communication connection request from the video game machine 5 or not in step S11 shown in FIG. 10.

If there is a serial communication connection request from the video game machine 5 in step S11, then the CPU 22 of the portable computer 4 starts communicating with the serial communication block 41 of the video game machine 5 via the serial communication block 25 to establish a communication link therewith in step S12. Thereafter, the CPU 22 stores the identification codes received via the established communication link into the nonvolatile memory 26 in step S13.

The processing in steps S12, S13 performed by the portable computer 4 corresponds to the processing in steps S3, S4 performed by the video game machine 5.

To confirm the end of the reception of the identification codes, the CPU 22 decides whether all the identification codes from the video game machine 5 have been received or not in step S14. If the CPU 22 confirms that all the identification codes have been received, then the portable computer 4 finishes the process of receiving the identification codes. If the CPU 22 confirms that all the identification codes have not been received, then the portable computer 4 executes the processing from step S13 again.

The above processing sequences of the video game machine 5 and the portable computer 4 enable the video game machine 5 to send identification codes for selectively receiving data to the portable computer 4 and set the identification codes in the portable computer 4.

Figure 11:
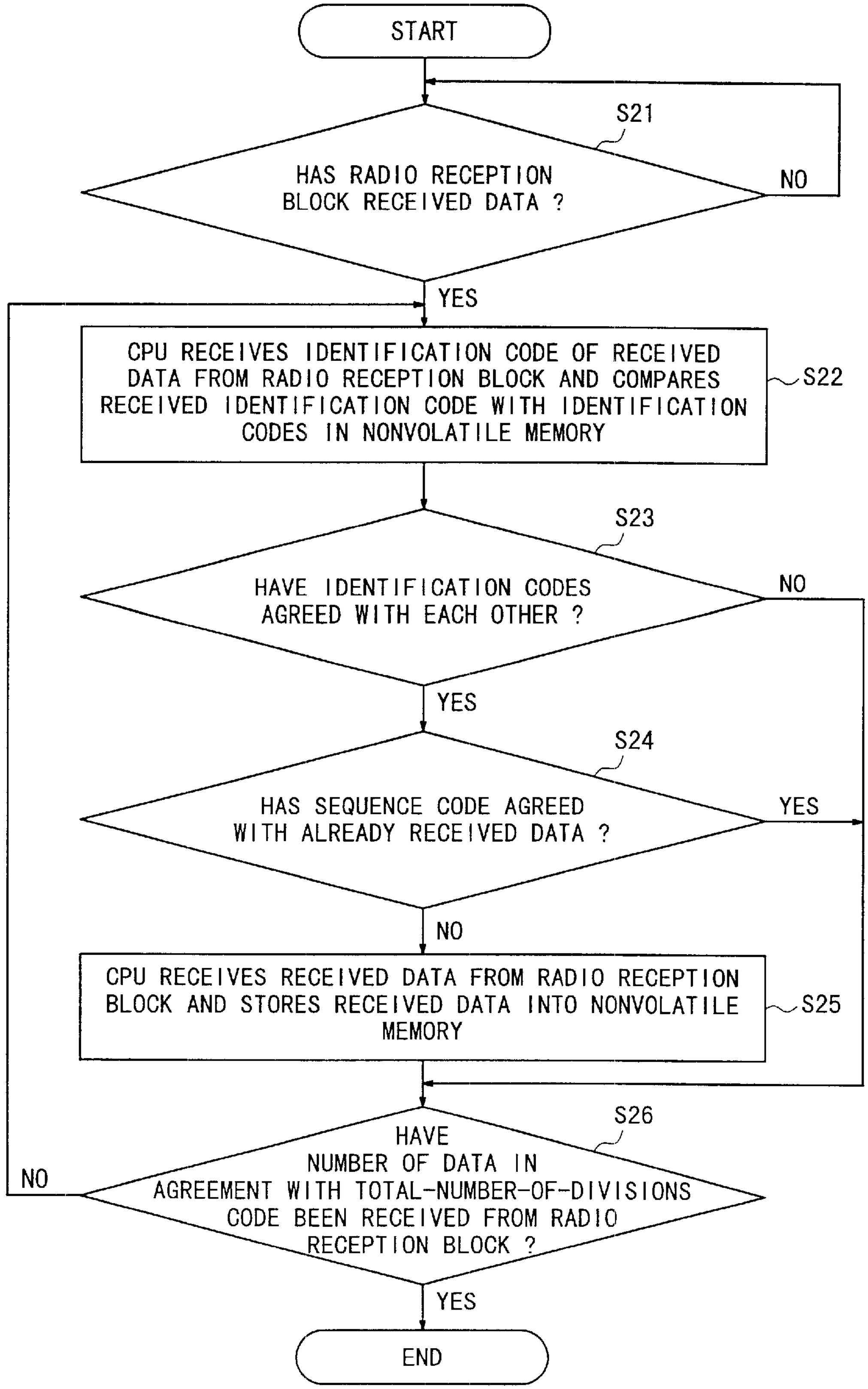
FIG. 11 is a flowchart of a processing sequence of a selective data receiving process in which the portable computer in which the identification codes are set receives radio data intermittently and repeatedly sent from the broadcasting base station and selectively receives data based on the identification codes held by the portable computer.

FIG. 11 shows a processing sequence of a selective data receiving process in which the portable computer 4 in which the identification codes are thus set receives radio data intermittently and repeatedly sent from the broadcasting base station 2 and selectively receives data based on the identification codes held by the portable computer 4.

As shown in FIG. 11, the portable computer 4 decides whether the radio reception block 21 has received data or not in step S21.

If the radio reception block 21 has received data, then the CPU 22 of the portable computer 4 receives an identification code in the received data from the radio reception block 21, and compares the identification codes stored in the nonvolatile memory 26 with the received identification code in step S22. If the CPU 22 confirms that one of the stored identification codes agrees with the received identification code in step S23, then control goes to step S24. If the CPU 22 confirms that the stored identification codes do not agree with the received identification code, then control jumps to step S26.

In step S24, the CPU 22 decides whether the sequence code agrees with the sequence codes in the already received data or not. If the CPU 22 confirms that the sequence code agrees with one of the sequence codes in the already received data, then control jumps to step S26. If the CPU 22 confirms that the sequence code does not agree with the sequence codes in the already received data, then control goes to step S25.

In step S25, the CPU 22 receives the received data whose identification information and sequence information do not agree from the radio reception block 21, and stores the data into the nonvolatile memory 26.

In step S26, the CPU 22 decides whether a number of data which agrees with the total-number-of-divisions code have been received from the radio reception block 21 or not. If the CPU 22 confirms that a number of data which agrees with the total-number-of-divisions code have been received from the radio reception block 21, then the portable computer 4 finishes the process of receiving the data. If the CPU 22 confirms that a number of data which agrees with the total-number-of-divisions code have not been received from the radio reception block 21, then the portable computer 4 executes the processing from step S22 again.

The above processing sequence of the portable computer 4 enables the portable computer 4 to selectively receive radio data sent intermittently and repeatedly from the broadcasting base station 2 based on identification codes.

Figure 12:
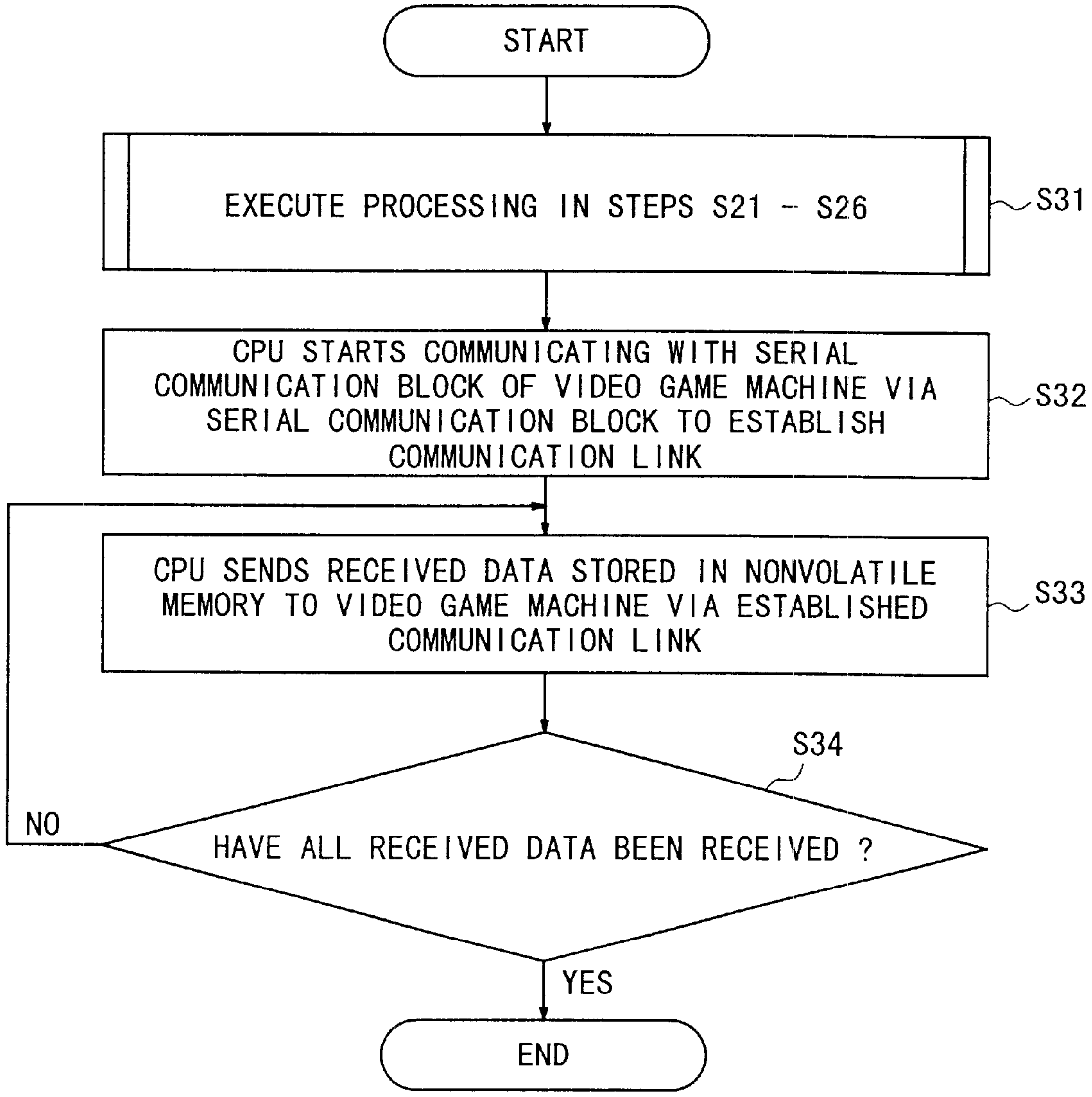
FIG. 12 is a flowchart of a processing sequence of the portable computer in a process of notifying the video game machine of the reception of the data when the portable computer selectively receives the data, and transferring the data selectively received by the portable computer to the video game machine based on the reception notification.
Figure 13:
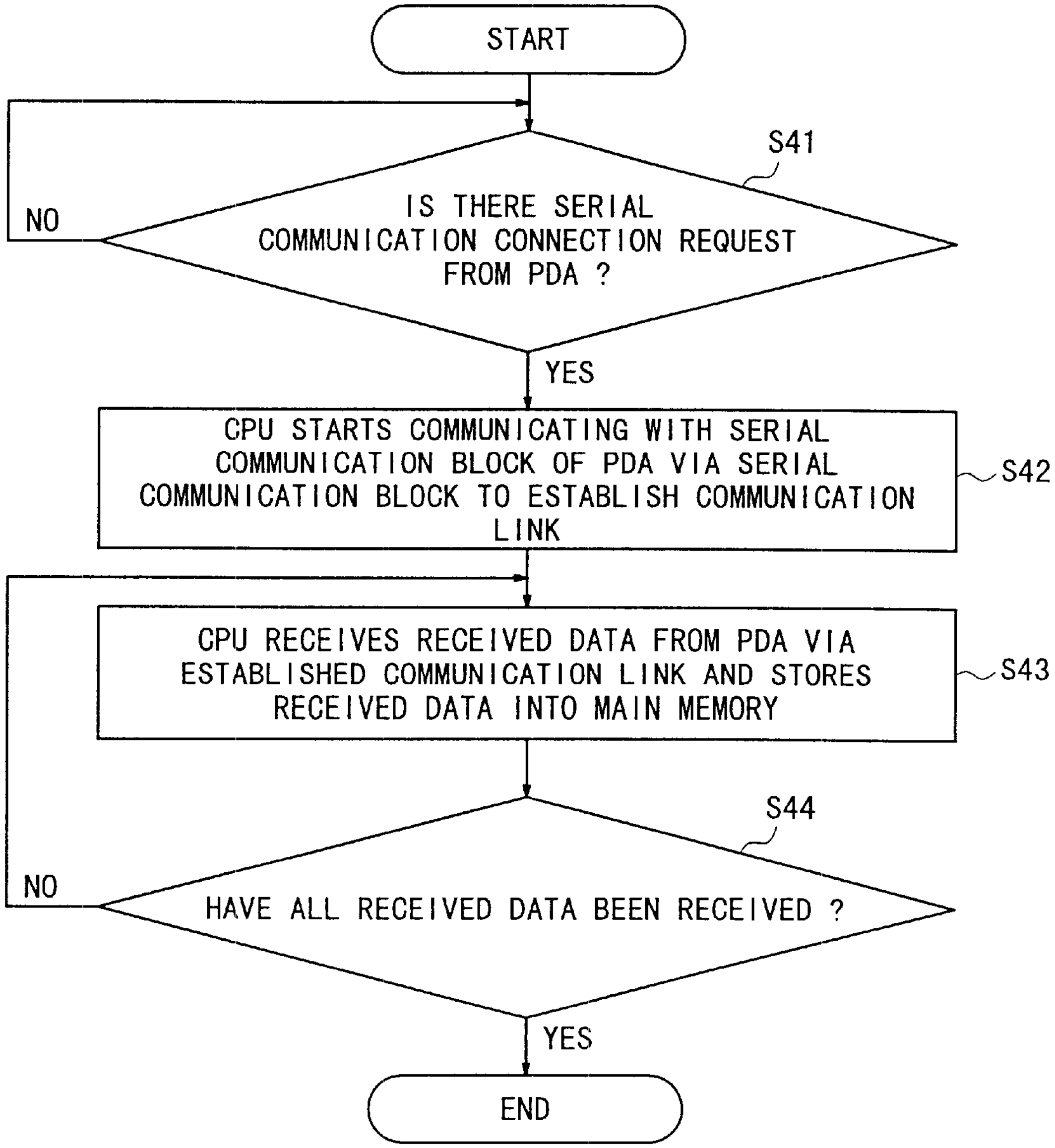
FIG. 13 is a flowchart of a processing sequence of the video game machine in the process of notifying the video game machine of the reception of the data when the portable computer selectively receives the data, and transferring the data selectively received by the portable computer to the video game machine based on the reception notification.

FIGS. 12 and 13 show a process of notifying the video game machine 5 of the reception of the data when the portable computer 4 selectively receives the data, and transferring the data selectively received by the portable computer 4 to the video game machine 5 based on the reception notification. FIG. 12 shows a processing sequence of the portable computer 4 for notifying the video game machine 5 of the reception of the data, and FIG. 13 shows a processing sequence of the video game machine 5 for receiving the data in response to the reception notification from the portable computer 4.

As shown in FIG. 12, the CPU 22 of the portable computer 4 executes the processing in steps S21 through S26 shown in FIG. 11 in step S31.

Then, the CPU 22 starts communicating with the serial communication block 41 of the video game machine 5 via the serial communication block 25 to establish a communication link therewith in step S32. Thereafter, the CPU 22 sends the received data stored in the nonvolatile memory 26 to the video game machine 5 via the established communication link in step S33.

The CPU 22 decides whether all the received data have been sent or not in step S34. If the CPU 22 confirms that all the received data have been sent, then the portable computer 4 finishes the processing of sending the data. If the CPU 22 confirms that all the received data have not been sent, then the portable computer 4 executes the processing from step S33 again.

Concurrent with the above process carried out by the portable computer 4, the video game machine 5 decides whether there is a serial communication connection request from the portable computer 4 or not in step S41 shown in FIG. 13.

Then, if the video game machine 5 confirms that there is a serial communication connection request from the portable computer 4, then the CPU 42 of the video game machine 5 starts communicating with the serial communication block 25 of the portable computer 4 via the serial communication block 41 to establish a communication link therewith in step S42. Thereafter, the CPU 42 receives the received data from the portable computer 4 via the established communication link, and stores the received data into the main memory 45 in step S43.

The processing in steps S42, S43 performed by the video game machine 5 corresponds to the processing in steps S32, S33 performed by the portable computer 4.

To confirm the end of the reception of the received data, the CPU 42 decides whether all the received data from the portable computer 4 have been received or not in step S44. If the CPU 42 confirms that all the received data from the portable computer 4 have been received, then the video game machine 5 finishes the processing of receiving the data. If the CPU 42 confirms that all the received data from the portable computer 4 have not been received, then the video game machine 5 executes the processing from step S43 again.

The above processing sequences of the portable computer 4 and the video game machine 5 enable the portable computer 4 to send the received data to the video game machine 5.

Figure 14:
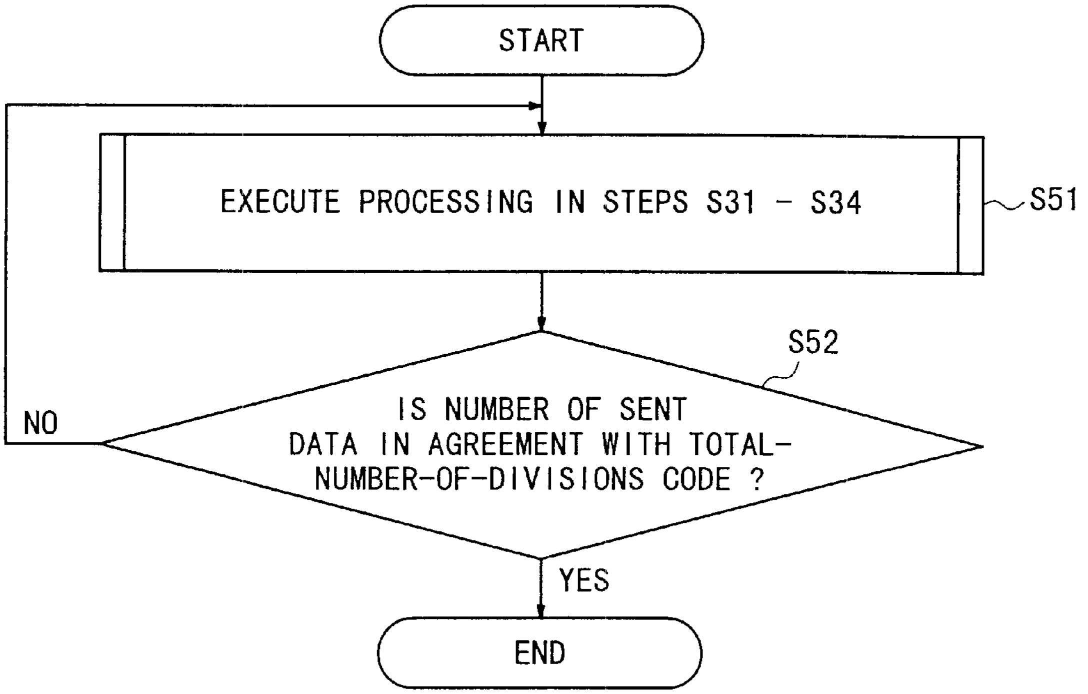
FIG. 14 is a flowchart of a processing sequence of the portable computer in a process of reconstructing the received data based on a sequence code of the received data with the video game machine which has received the received data from the portable computer.
Figure 15:
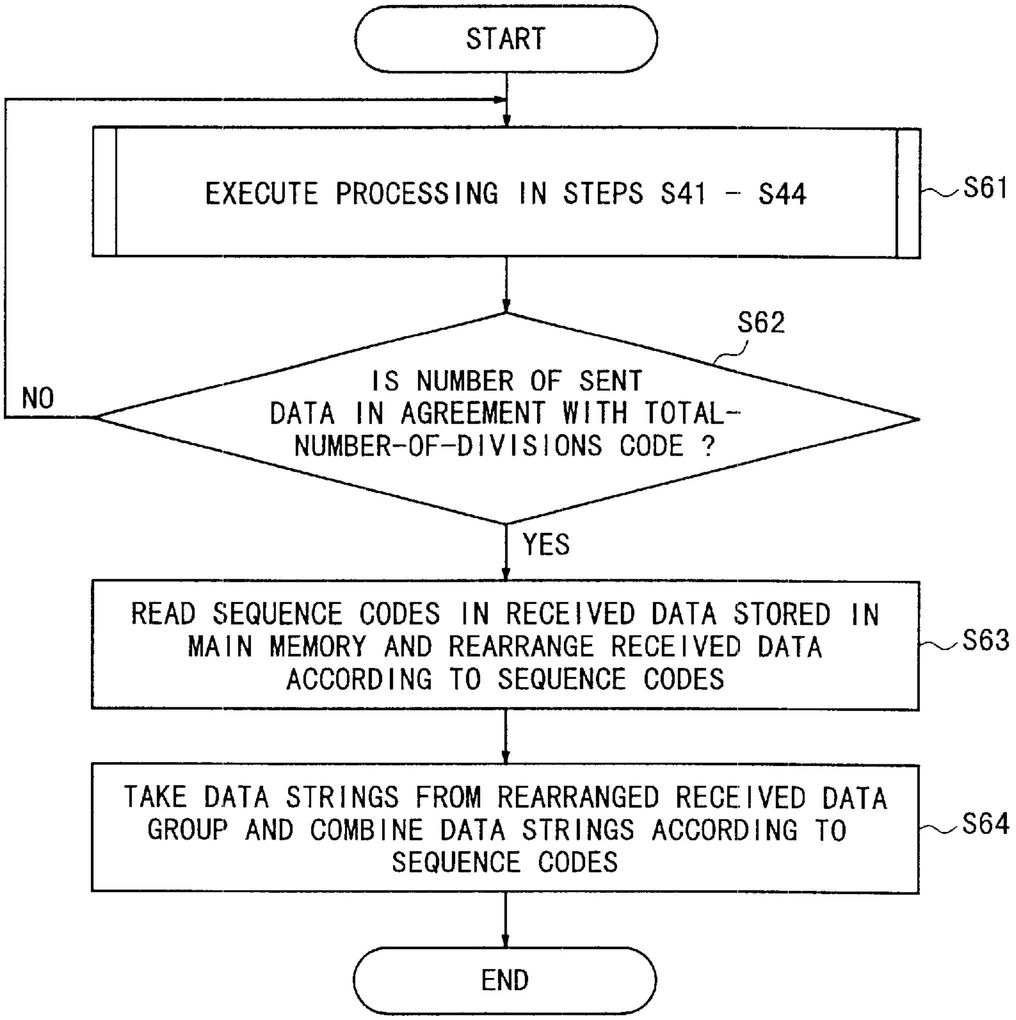
FIG. 15 is a flowchart of a processing sequence of the portable computer in the process of reconstructing the received data based on a sequence code of the received data with the video game machine which has received the received data from the portable computer.

FIGS. 14 and 15 show a process of reconstructing the received data based on sequence codes of the received data with the video game machine 5 which has received the received data from the portable computer 4. FIG. 14 shows a processing sequence of the portable computer 4, and FIG. 15 shows a processing sequence of the video game machine 5.

As shown in FIG. 14, the CPU 22 of the portable computer 4 executes the processing in steps S31 through S34 shown in FIG. 12 in step S51. Then, the CPU 22 decides whether the number of data sent to the video game machine 5 agrees with the total-number-of-divisions code or not in step S52. If the CPU 22 confirms that the number of data sent to the video game machine 5 agrees with the total-number-of-divisions code, then the portable computer 4 finishes the process of sending the received data to the video game machine 5. If the CPU 22 confirms that the number of data sent to the video game machine 5 does not agree with the total-number-of-divisions code, then the portable computer 4 executes the processing from step S51, i.e., the processing from steps S31 through S34 shown in FIG. 12, again.

Concurrent with the above process carried out by the portable computer 4, the video game machine 5 executes the processing in steps S41 through S44 shown in FIG. 13 in step S61 as shown in FIG. 15. Then, the CPU 42 decides whether the number of data received from the portable computer 4 agrees with the total-number-of-divisions code or not in step S62. If the CPU 42 confirms that the number of data received from the portable computer 4 agrees with the total-number-of-divisions code, then control proceeds to step S63. If the number of data received from the portable computer 4 do not agree with the total-number-of-divisions code, then the video game machine 5 executes the processing from step S61, i.e., the processing from steps S41 through S44 shown in FIG. 13, again.

In step S63, the CPU 42 reads sequence codes in the received data stored in the main memory 45, and rearranges the received data according to the sequence codes.

Thereafter, in step S64, the CPU 42 reads data strings from the rearranged received data group, and combines the data strings according to the sequence codes for thereby recovering the original data. The process of reconstructing the received data now comes to an end.

Figure 16:
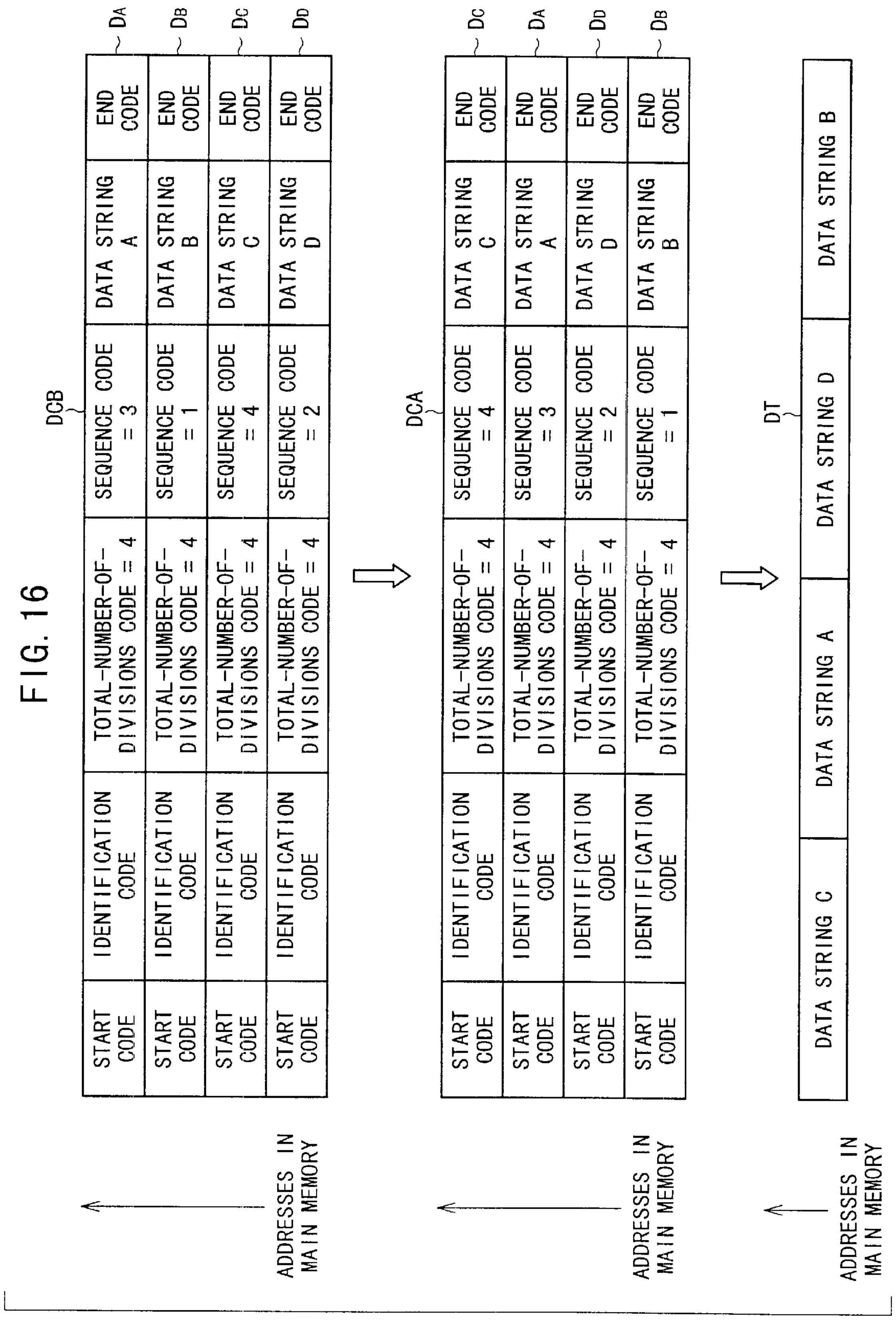
FIG. 16 is a diagram illustrative of a procedure for reconstructing a group of received data in a main memory of the video game machine.

FIG. 16 shows a data image in the main memory 45 at the time the received data group is reconstructed in the main memory 45.

In FIG. 16, the reference characters "DCB" represent an array of received data before they are reconstructed. For example, the array DCB of received data is produced by the processing in steps S61, S62 shown in FIG. 15, i.e., immediately after the received data from the portable computer 4 are sent and stored in the main memory 45.

The reference characters "DCAN" represent an array of received data after they are reconstructed. For example, the array DCA of received data is produced by the processing in step S63 shown in FIG. 15, i.e., by rearranging the received data according to the sequence codes in the received data.

The reference characters "DT" represent an array of data strings that are rearranged and restored. For example, the array DT of data strings is produced by the processing in step S64 shown in FIG. 15.

Specifically, the video game machine 5 rearranges received data $D_D$, $D_C$, $D_B$, $D_A$ with respective sequence codes "2", "4", "1", "3" irregularly stored in the main memory 45, as indicated by the array DCB of received data, into received data $D_B$, $D_D$, $D_A$, $D_C$ with respective sequence codes "1", "2", "3", "4" by referring to the sequence codes, as indicated by the array DCA of received data Then, the video game machine 5 takes data strings from the rearranged received data $D_B$, $D_D$, $D_A$, $D_C$, and combines them as data strings B, D, A, C according to the sequence codes for thereby restoring the original data.

As described above, the video game machine 5 reconstructs a plurality of received data from the portable computer 4 based on the sequence codes in the received data.

Figure 17:
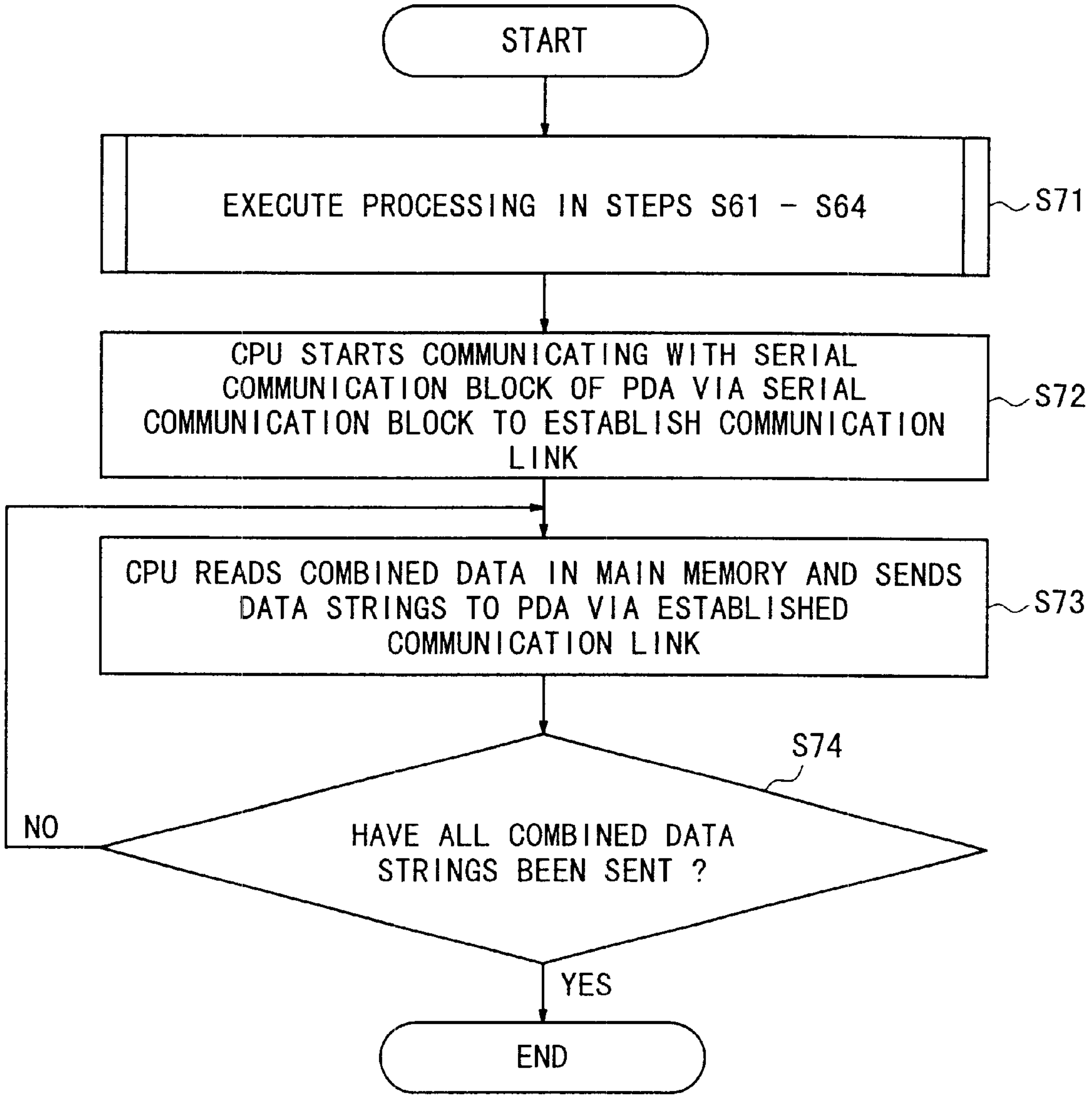
FIG. 17 is a flowchart of a processing sequence of the video game machine in a process of sending data restored by the video game machine to the portable computer.
Figure 18:
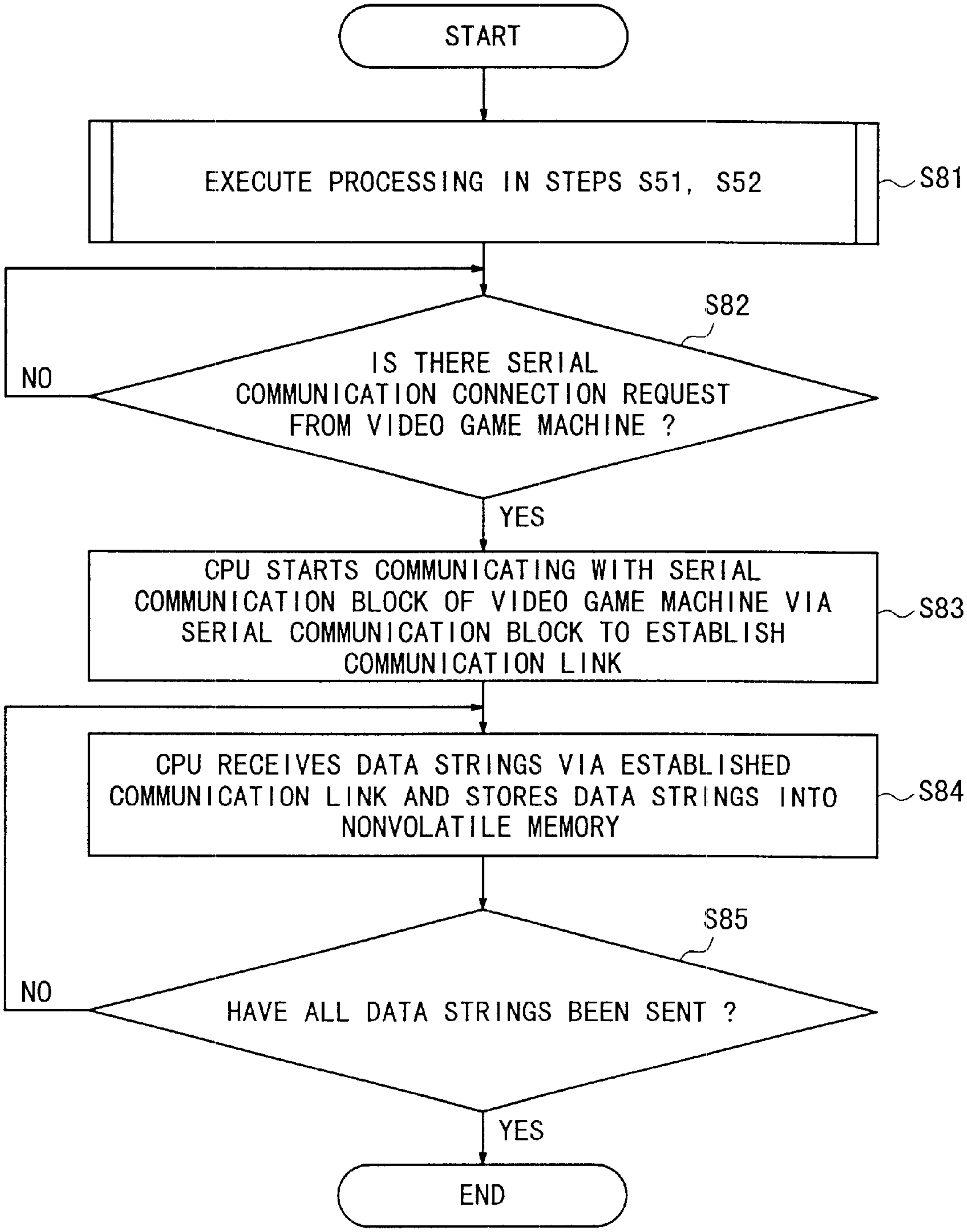
FIG. 18 is a flowchart of a processing sequence of the portable computer in the process of sending data restored by the video game machine to the portable computer.

The reconstructed data may be used in the portable computer 4 again. FIGS. 17 and 18 show a process of sending data restored by the video game machine 5 to the portable computer 4. FIG. 17 shows a processing sequence of the video game machine 5, and FIG. 18 shows a processing sequence of the portable computer 4.

As shown in FIG. 17, the video game machine 5 executes the processing in the steps S61 through S64 shown in FIG. 15 in step S71, i.e., the process of receiving the received data from the portable computer 4 and the process of restoring data strings based the sequence codes in the received data. Thereafter, the CPU 42 starts communicating with the serial communication block 25 of the portable computer 4 via the serial communication block 41 to establish a communication link therewith in step S72. Then, the CPU 42 reads the combined data strings from the main memory 45, and sends the combined data strings to the portable computer 4 via the established communication link in step S73.

To confirm the end of the transmission of the combined data strings, the CPU 42 decides whether all the combined data strings have been sent or not in step S74. If the CPU 42 confirms that all the combined data strings have been sent, then the video game machine 5 finishes the processing of sending the combined data string. If the CPU 42 confirms that all the combined data strings have not been sent, then the video game machine 5 executes the processing from step S73 again.

Concurrent with the above process carried out by the video game machine 5, the portable computer 4 executes the processing in steps S51, S52 shown in FIG. 11 in step S81 shown in FIG. 18. Thereafter, the portable computer 4 decides whether there is a serial communication connection request from the video game machine 5 or not in step S82.

If there is a serial communication connection request from the video game machine 5 in step S82, then the CPU 22 of the portable computer 4 starts communicating with the serial communication block 41 of the video game machine 5 via the serial communication block 25 to establish a communication link therewith in step S83. Thereafter, the CPU 22 receives the combined data strings via the established communication link, and stores the received data strings into the nonvolatile memory 26 in step S84.

The processing in steps S83, S84 performed by the portable computer 4 corresponds to the processing in steps S72, S73 performed by the video game machine 5.

To confirm the end of the reception of the combined data strings, the CPU 22 decides whether all the combined data strings from the video game machine 5 have been received or not in step S85. If the CPU 22 confirms that all the combined data strings from the video game machine 5 have been received, then the portable computer 4 finishes the process of receiving the combined data strings. If the CPU 22 confirms that all the combined data strings from the video game machine 5 have been received, then the portable computer 4 executes the processing from step S84 again.

The process of selectively receiving received data, the process of combining data strings included in the selectively received data, and other processes in the receiving system 3 have been described above with reference to FIGS. 9 through 18.

In the radio data sending and receiving system 1, the portable computer 4 of the receiving system 3 is capable of receiving radio data, and is also electrically connectable to the video game machine 5. Specifically, the portable computer 4 is arranged as being equivalent to a memory card system that is a memory device removably connectable to the video game machine 5, with a radio data reception capability. Therefore, the portable computer 4 can receive a large amount of data supplied via a radio broadcast, e.g., application software for use with video game machines, as real-time data. The receiving system 3 thus constructed allows software contents, such as video games triggered by events in the actual world, to be developed and presented to the market.

In the receiving system 3, as described above, the portable computer 4 receives a plurality of radio data that are sent intermittently and repeatedly, and the video game machine 5 combines the plurality of radio data received by the portable computer 4. The receiving system 3 is capable of reproducing the data correctly even if the data are received in a different sequence due to an error or the like. Since the video game machine 5 combines the data, it is possible to combine data having a larger size than each of data transmission units, and the video game machine 5 and the portable computer 4 can use such data having a larger size than each of data transmission units. Application software run by the video game machine 5 allows the contents of the data to be changed if necessary, and also allows the changed data to be sent to the portable computer 4, which stores the changed data therein.

As described above, data broadcast from the broadcasting base station 2 and received by the portable computer 4 are determined by identification codes set by the video game machine 5. Thus, application software run by the video game machine 5 allows radio data to be selected for reception by the portable computer 4. The portable computer 4 which has limited computational resources such as a storage capacity can select only required data, making it possible to effectively utilize such computational resources, and also making it possible for the broadcasting base station 2 to send mixed data of a plurality of applications. Sending mixed data of a plurality of applications leads to effective utilization of communication bandwidths.

As described above, the radio data sending and receiving system 1 divides data to be sent, which have heretofore been sent as one entity, into divided data, and sends the divided data.

FIGS. 19A, 19B, 19C, 19D and 20A, 20B, 20C, 20D show specific examples of data formats for dividing data and sending divided data. The data format shown in FIGS. 19A through 19D is based on a NTT 1200 bps scheme for a radio pager system, and the data format shown in FIGS. 20A through 20D is based on the standards RCR STD-43A for an advanced radio pager system.

Figures 19A, 19B, 19C, 19D:
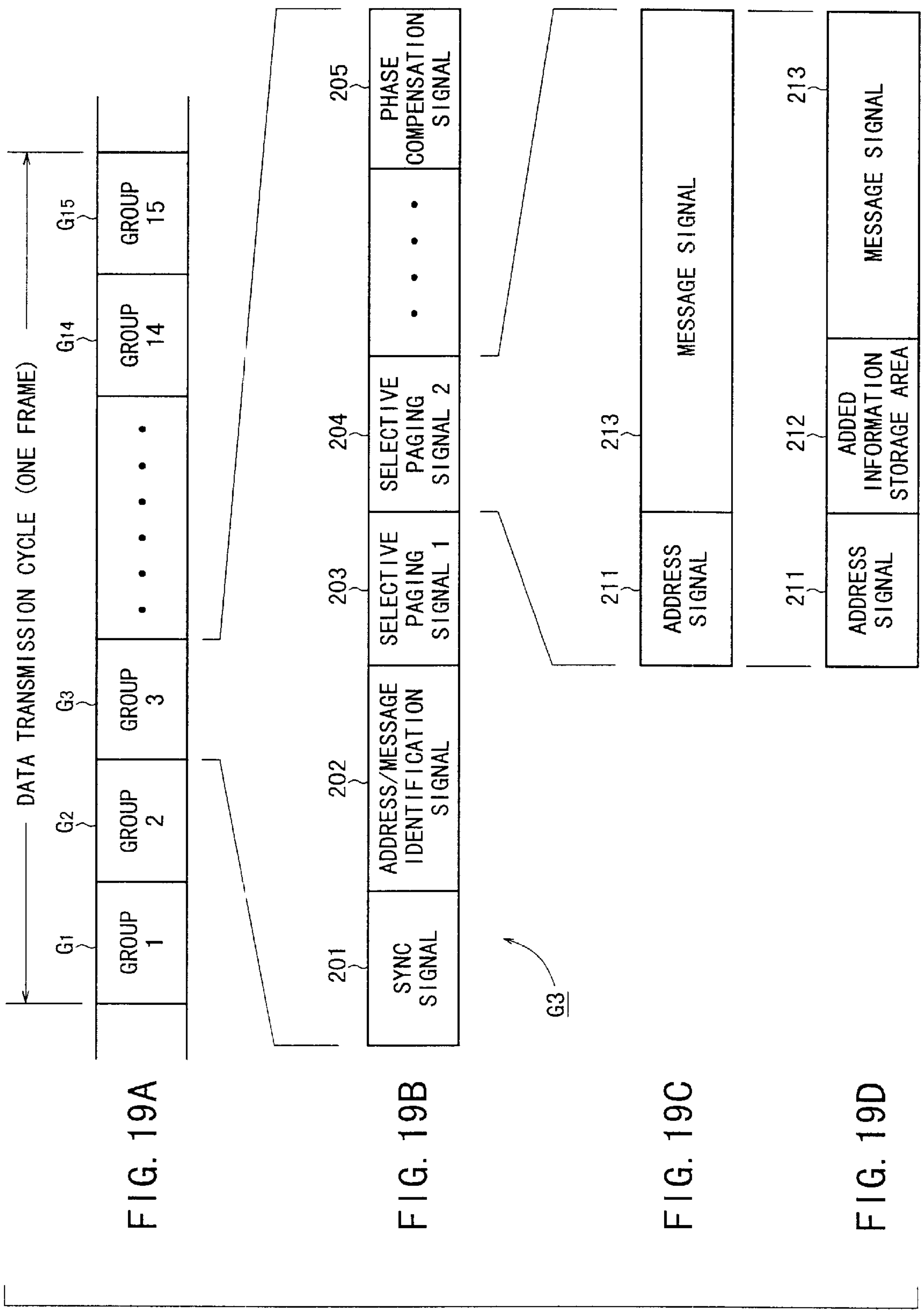
FIGS. 19A through 19D are diagrams showing a data format for data sent by the broadcasting base station, which employs an NTT (Nippon Telegraph and Telephone Corporation) 1200 bps scheme for a radio pager system, FIG. 19A showing a data sending cycle of one frame, FIG. 19B showing the arrangement of a group, FIG. 19C showing an arrangement of a selective paging signal, and FIG. 19D showing another arrangement of a selective paging signal.

According to the NTT 1200 bps scheme for a radio pager system, as shown in FIG. 19A, a data transmission cycle as one frame comprises 15 groups $G_1$, $G_2$, $G_3$, . . . , $G_{14}$, $Q_{15}$ each as a data transmission unit. The data transmission cycle as one frame has a period of about 29 seconds, for example.

As shown in FIG. 19B, each of the groups comprises a synchronizing signal 201, an address/message identification signal 202, a pair of selective paging signals 203, 204, and a phase compensation signal 205. The address/message identification signal 202 represents codes indicative of an arrangement of signals within each of the selective paging signals.

As shown in FIG. 19C, each of the selective paging signals 203, 204 comprises an address signal 211 and a message signal 213.

According to the NTT 1200 bps scheme for a radio pager system, the data shown in FIG. 6 are stored in certain groups in each data transmission cycle for transmission.

The above signals will be described in connection with the data string $D_X$ and the various codes added thereto in FIG. 6. The data string $D_X$ is stored in the area of the message signal 213 shown in FIG. 19C, and the identification code $D_F$ is stored in the area of the address signal 211 shown in FIG. 19C.

The identification code $D_F$ may, however, be stored in an added information storage area 212 in each of the selective paging signals 203, 204, as shown in FIG. 19D, or in the area of the address signal 211 and the added information storage area 212.

The identification code $D_F$ may also be stored in the data layer shown in FIG. 19B, e.g., in the area of the address/message identification signal 202. The start code DS shown in FIG. 6 is stored in the area of the synchronizing signal 201, for example.

Figures 20A, 20B, 20C, 20D:
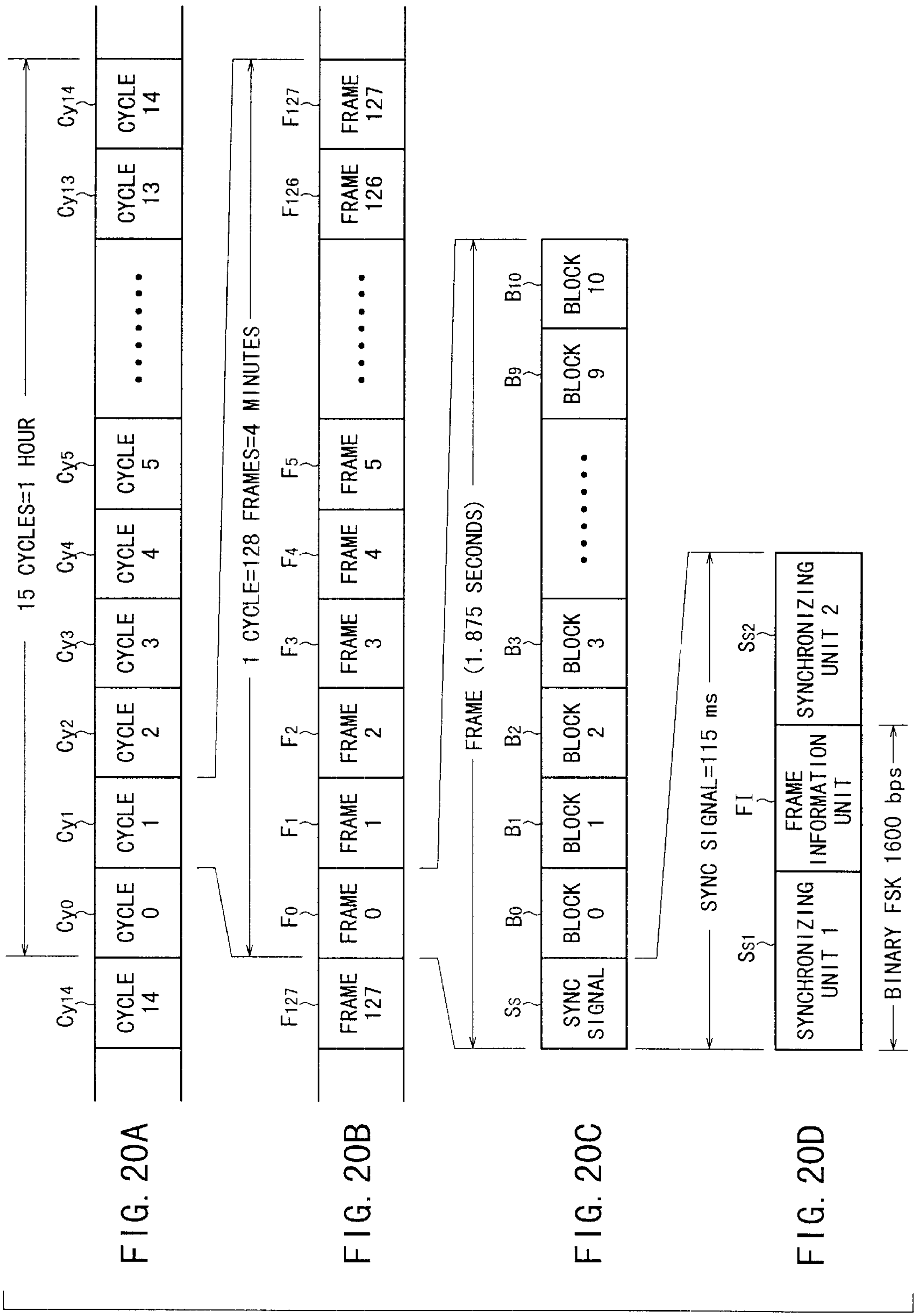
FIG. 20A is a diagram of one data sending cycle comprising cycles according to standards RCR STD-43A for an advanced radio pager system.
FIG. 20B is a diagram of the detailed arrangement of one cycle comprising 128 frames.
FIG. 20C is a diagram showing the arrangement of one frame.
FIG. 20D is a diagram showing the arrangement of a synchronizing signal.

According to the standards RCR STD-43A for an advanced radio pager system, as shown in FIG. 20A, one data transmission cycle comprises 15 cycles $C_{y0}$, $C_{y1}$, $C_{y2}$, $C_{y3}$, $C_{y4}$, $C_{y5}$, . . . , $C_{y13}$ $C_{y14}$. One data transmission cycle, i.e., 15 cycles $C_{y0}$–$C_{y14}$, has a period of about one hour.

As shown in FIG. 20B, each of the 15 cycles $C_{y0}$, $C_{y14}$ comprises 128 frames $F_0$, $F_1$, $F_2$, $F_3$, $F_4$, $F_5$, . . . , $F_{126}$, $F_{127}$. One cycle has a period of about four minutes.

As shown in FIG. 20C, each of the 128 frames $F_0$–$F_{127}$ comprises a synchronizing signal SS and 11 blocks $B_0$, $B_1$, $B_2$, $B_3$, . . . , $B_9$, $B_{10}$. One frame has a period of about 1.875 seconds.

As shown in FIG. 20D, the synchronizing signal SS comprises a first synchronizing unit $S_{S1}$, a frame information unit FI, and a second synchronizing unit $S_{S2}$. The synchronizing signal $S_s$ has a period of about 115 ms.

According to the standards RCR STD-43A for an advanced radio pager system, the data shown in FIG. 6 are stored in certain cycles of each data transmission cycle for transmission.

The divided data to be sent may not necessarily be stored in the above storage areas in the data transmission cycle, i.e., the groups shown in FIG. 19A and the cycles shown in FIG. 20A. Alternatively, the divided data may be stored in storage areas in a lower layer, e.g., the frames shown in FIG. 20B*b*. Specifically, the divided layers may be stored in certain frames of a data transmission cycle which is a transmission cycle of a group of frames, for transmission.

The data format for transmitting the above divided data is not limited to the data formats shown in FIGS. 19A–19D and FIGS. 20A–20D, but may be a data format of a next generation.

In the above embodiment, data strings are restored by the video game machine 5 as a first data processing means. However, data strings may also be restored by the portable computer (data restoring means) 4 as a second data processing means.

Further, the receiving system 3 can receive data in a state in which the portable computer 4 is attached to the video game machine 5. Alternatively, the receiving system 3 can receive data in a state in which the portable computer 4 is removed from the video game machine 5.

FIGS. 21 through 28 show a specific arrangement of the receiving system 3 as a video entertainment system. In FIGS. 21 through 28, the video game machine 5 and the portable computer 4 of the receiving system 3 are arranged as a video entertainment system which comprises a video game apparatus 301 as a first data processing means and a video entertainment apparatus, and a portable electronic device 400 removably connected to the video game apparatus 301 for performing data communications therewith, the portable electronic device 400 serving as a second data processing means.

The video game machine 5 corresponds to the video game apparatus 301, and the portable computer 4 corresponds to the portable electronic device 400. Specifically, the CPU 42 and the main memory 45 of the video game machine 5 correspond respectively to a CPU 351 and a main memory 353 of the video game apparatus 301 shown in FIG. 26. The antenna 11 and the reception block 21, the CPU 22, and the nonvolatile memory 26 of the portable computer 4 correspond respectively to a radio reception means 449, a control means 441, and a nonvolatile memory 446 shown in FIG. 27.

Figure 21:
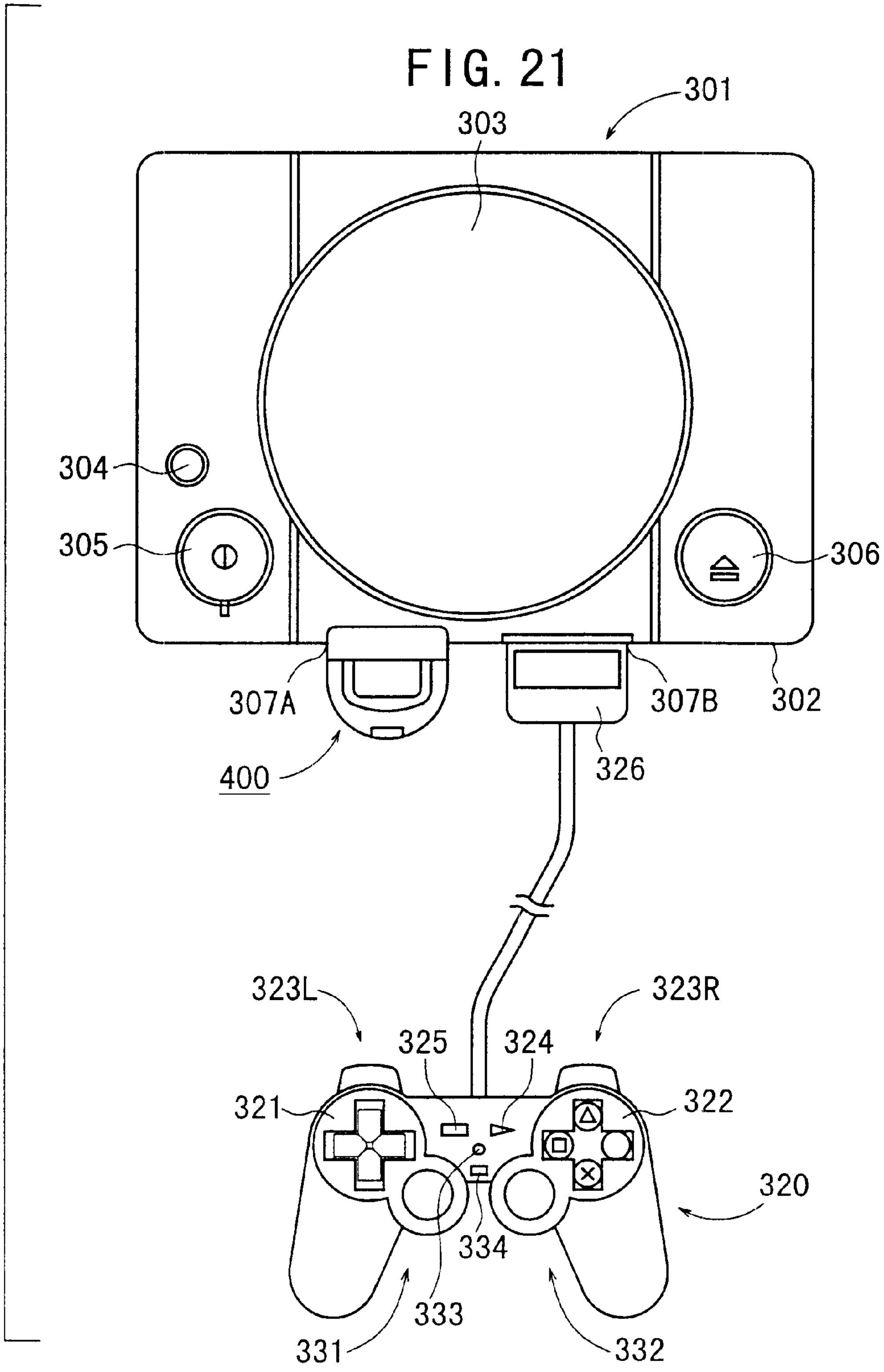
FIG. 21 is a plan view of a video entertainment system which is a specific example of the receiving system comprising the portable computer and the video game machine.
Figure 22:
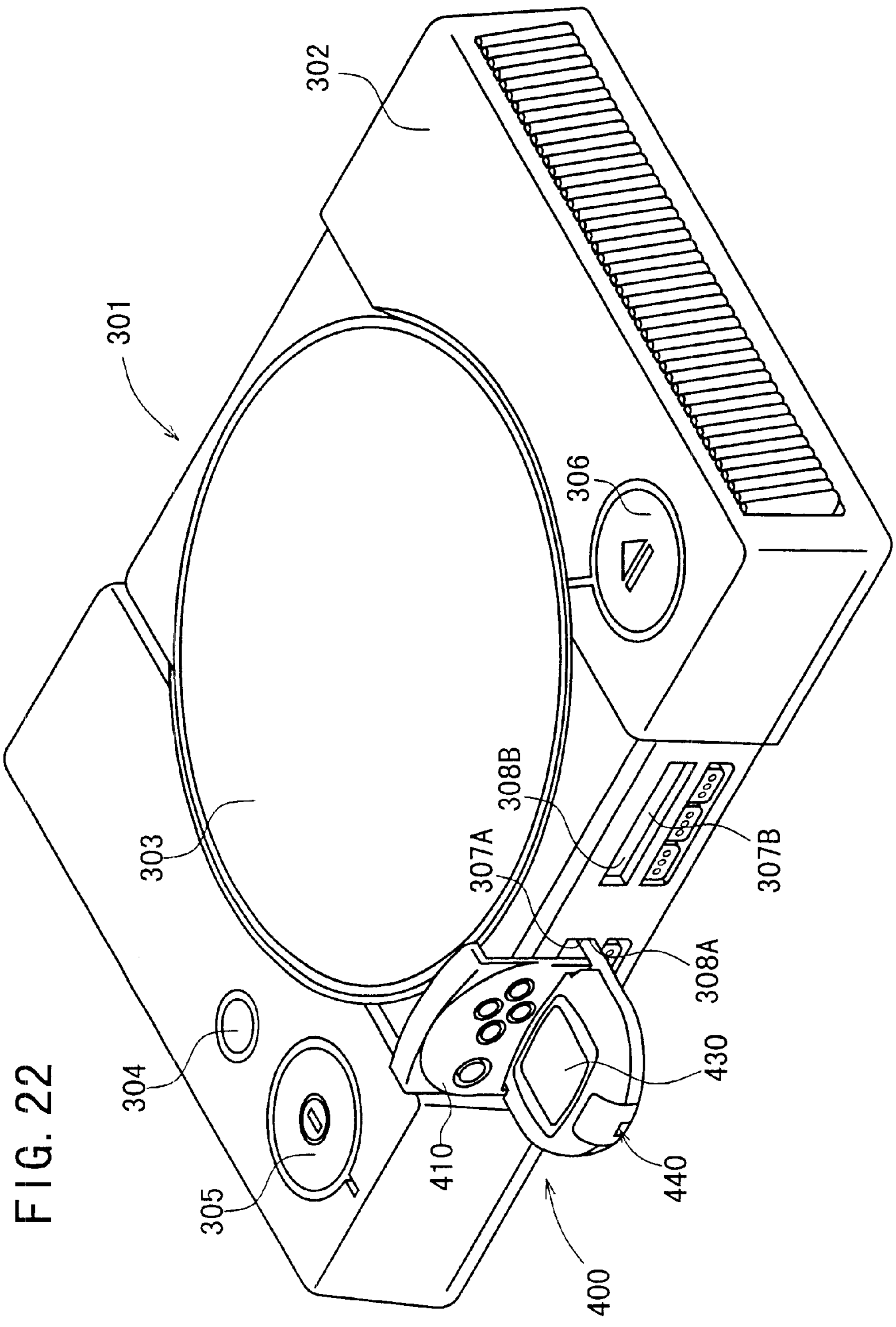
FIG. 22 is a perspective view of the video entertainment system shown in FIG. 21.

As shown in FIGS. 21 and 22, the video game apparatus 301 reads an application program from the recording medium, and executes the application program according to instructions from the user, i.e., the game player. For example, the video game apparatus 301 executes a game program mainly to proceed with a game, display game images, and output sounds.

The video game apparatus 301 has a rectangular casing 302 which houses a disk loading unit 303 substantially centrally therein for loading an optical disk such as a CD-ROM or the like as a recording medium for supplying an application program such as a game program or the like. The casing 302 supports a reset switch 304 for resetting a video game, a power supply switch 305, a disk control switch 306 for controlling the loading of the optical disk, and two slots 307A, 307B.

The video game apparatus 301 may be supplied with an application program via a communication link, rather than being supplied from the recording medium.

The portable electronic device 400 and a manual controller 320 can be connected to the slots 307A, 307B. A memory card system may also be connected to the slots 307A, 307B.

The manual controller 320 has first and second control pads 321, 322, a left button 323L, a right button 323R, a start button 324, a selector button 325, analog control pads 331, 332, a mode selector switch 333 for selecting control modes for the analog control pads 331, 332, and an indicator 334 for indicating a selected control mode. The manual controller 320 also has a vibration imparting mechanism (not shown) disposed therein for imparting vibrations to the manual controller 320 depending on how the video game proceeds. The manual controller 320 is electrically connected to the slot 307B in the casing 302 by a connector 326.

If two manual controllers 320 are connected respectively to the slots 307A, 307B, two users or game players can share the video entertainment system to play a competition game, for example. The video game apparatus 301 may have more or less than two slots 307A, 307B.

Figure 23:
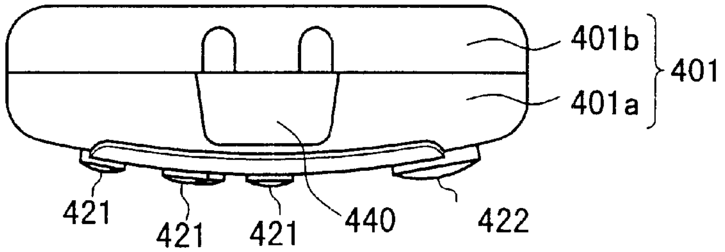
FIG. 23 is a plan view of a portable electronic device which is a specific example of the portable computer.
Figure 24:
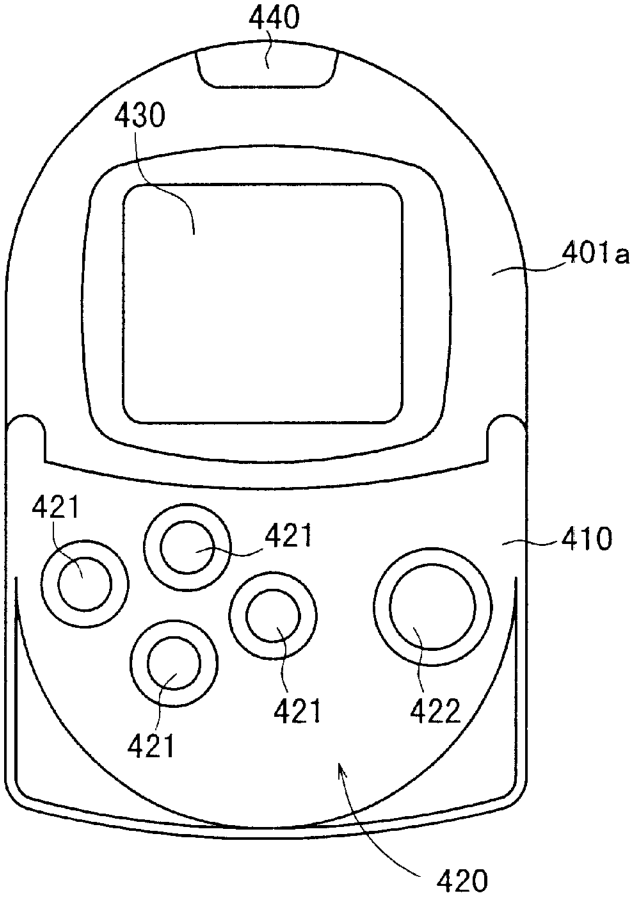
FIG. 24 is a front elevational view of the portable electronic device shown in FIG. 23.
Figure 25:
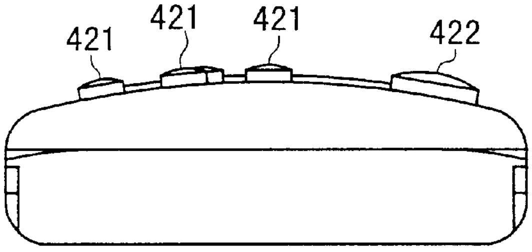
FIG. 25 is a bottom view of the portable electronic device shown in FIG. 23.

As shown in FIGS. 23, 24, and 25, the portable electronic device 400 has a housing 401 which supports a manual control pad 420 for entering various items of information, a display unit 430 such as a liquid crystal display (LCD) unit or the like, and a window 440 for allowing a wireless communication unit to perform wireless communication such as infrared communication.

The housing 401 comprises an upper shell 401*a* and a lower shell 401*b*, and houses a board which supports memory devices, etc. thereon. The housing 401 is shaped so as to be insertable into either one of the slots 307A, 307B in the casing 302.

The window 440 is mounted on a substantially semicircular end of the housing 401. The display unit 430 occupies a substantially half area of the upper shell 401*a* of the housing 401, and is positioned near the window 440.

The manual control pad 420 has a plurality of control buttons 421, 422 for entering events and making various selections. The manual control pad 420 occupies the other substantially half area of the upper shell 401*a*, and is positioned remotely from the window 440. The manual control pad 420 is disposed on a lid 410 that is angularly movably supported on the housing 401. The control buttons 421, 422 extend through the lid 410 from its upper surface to its lower surface. The control buttons 421, 422 are supported on the lid 410 for movement into and out of the upper surface of the lid 410.

The portable electronic device 400 has a board disposed in the housing 410 and facing the lid 410 as it is closed over the housing 401. The board supports a plurality of switch pressers held in alignment with the respective control buttons 421, 422 when the lid 410 is closed over the housing 401. When one of the control buttons 421, 422 is pressed by the user, it actuates the corresponding switch presser to press a pressure switch such as a diaphragm switch, for example.

As shown in FIG. 22, the portable electronic device 400 with the lid 410 being open is inserted into the slot 307A in the casing 302 of the video game apparatus 301.

The video game apparatus 301 and the portable electronic device 400 have respective appearances and structures as described above.

Figure 26:
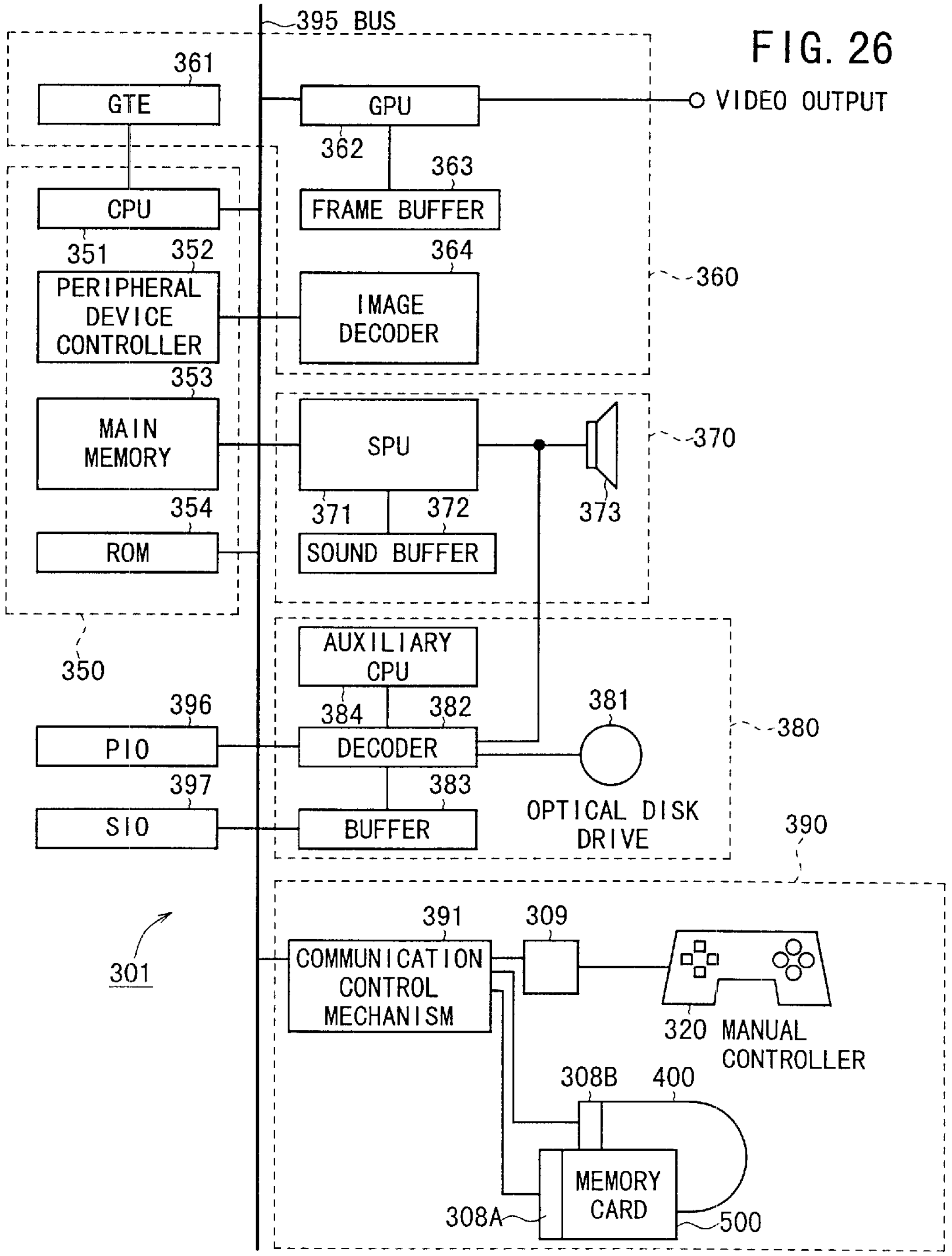
FIG. 26 is a block diagram of a video game apparatus which is a specific example of the video game machine.
Figure 27:
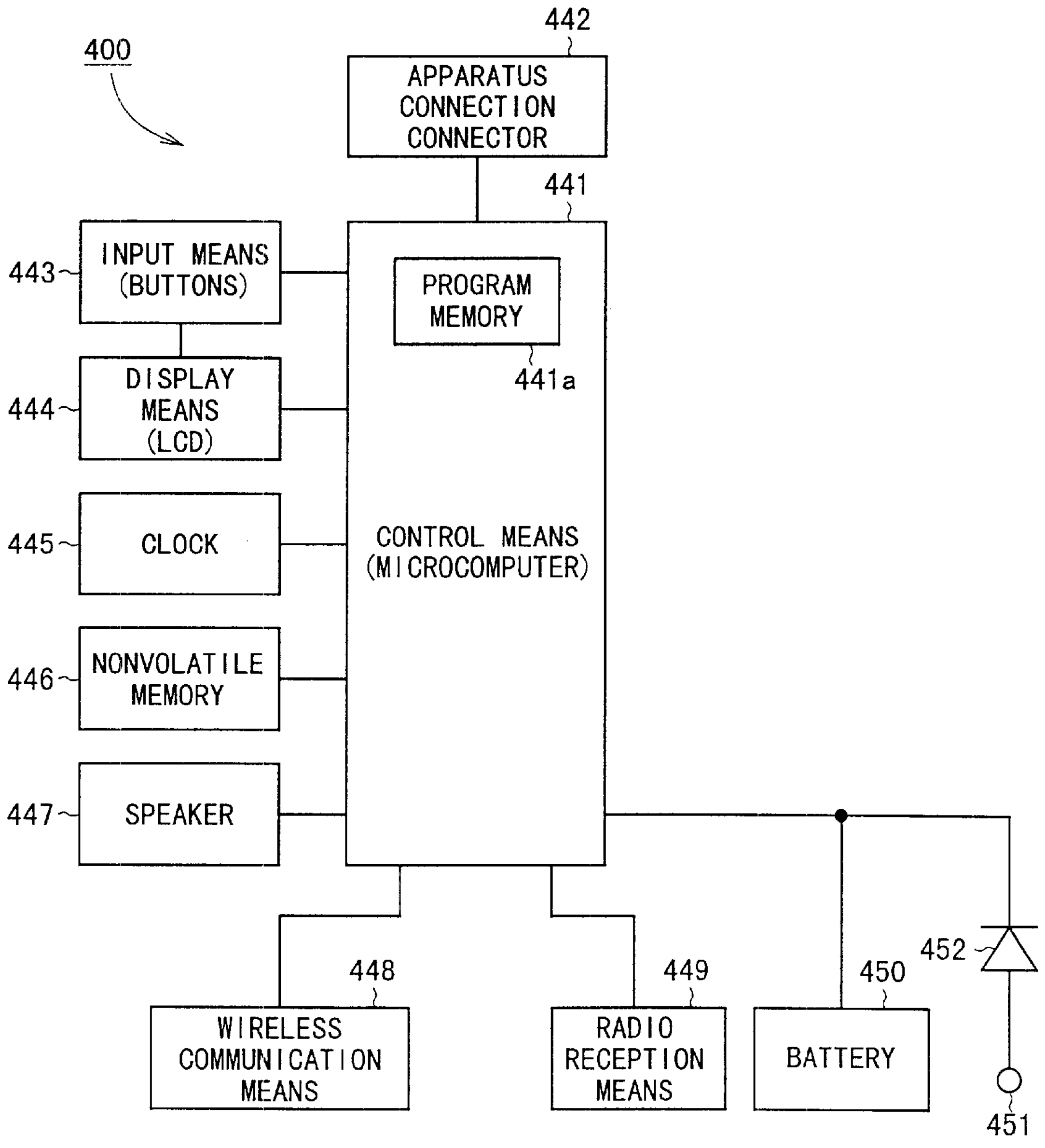
FIG. 27 is a block diagram of the portable electronic device shown in FIG. 23.
Figure 28:
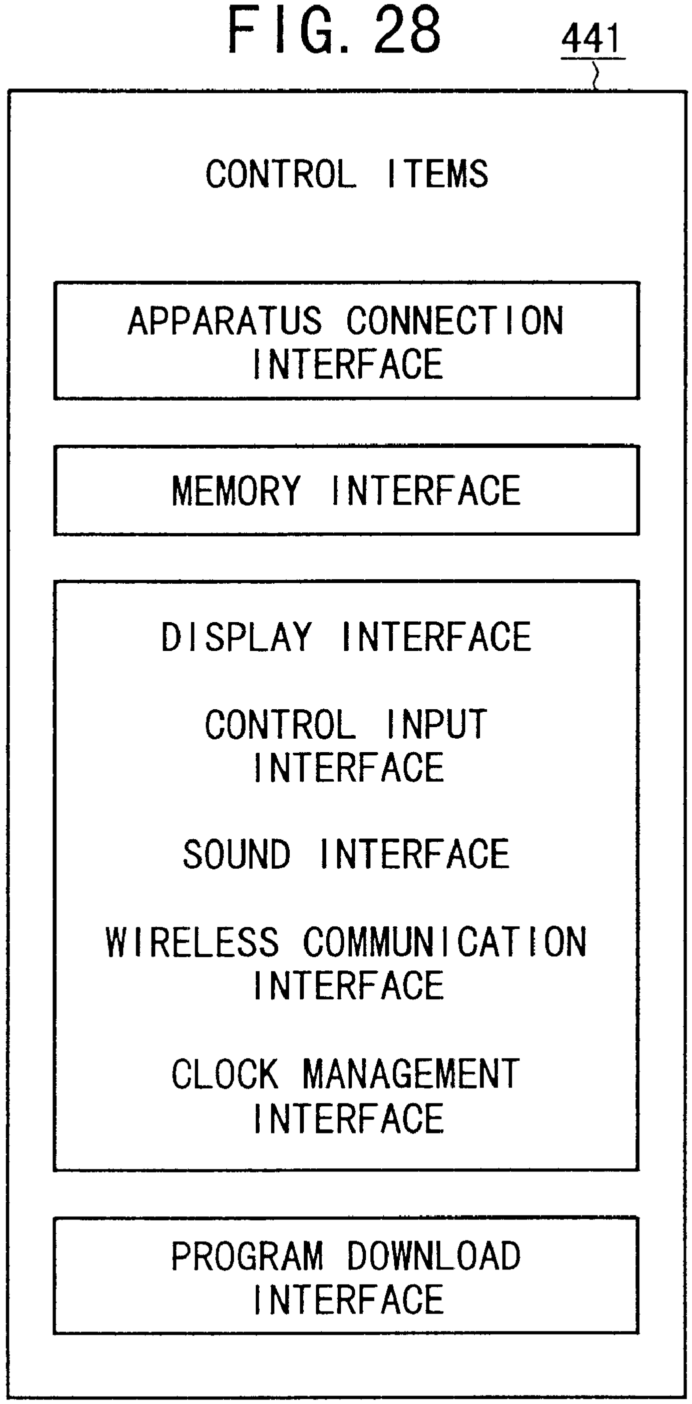
FIG. 28 is a diagram showing control items controlled by a control means in the portable electronic device shown in FIG. 27.

FIGS. 26, 27 and 28 show circuit arrangements of the video game apparatus 301 and the portable electronic device 400.

As shown in FIG. 26, the video game apparatus 301 comprises a control system 350 including a central processing unit (CPU) 351 and its peripheral devices, a graphic system 360 including a graphic processing unit (GPU) 362 for plotting image data in a frame buffer 363, a sound system 370 including a sound processing unit (SPU) 371 for generating music sounds and sound effects, an optical disk controller 380 for controlling an optical disk in which application programs are recorded, a communication controller 390 for controlling signals from the manual controller 320 which enter instructions from the user, and data supplied to and from a memory card 500 which stores game settings and the portable electronic device 400, a bus 395 to which the control system 350, the graphic system 360, the sound system 370, the optical disk controller 380, and the communication controller 390 are connected, a parallel I/O interface (PIO) 396 and a serial I/O interface (SIO) 397 which interface another apparatus.

The control system 350 comprises a CPU 351, a peripheral device controller 352 for controlling direct memory access (DMA) data transfer, a main memory 353 comprising a random-access memory (RAM), and a read-only memory (ROM) 354 which stores various programs such as an operating system for managing the main memory 353, the graphic system 360, the sound system 370, etc.

The CPU 351 controls the video game apparatus 301 in its entirety by executing the operating system stored in the ROM 354.

When the video game apparatus 301 is turned on, the CPU 351 executes the operating system stored in the ROM 354 to start controlling the graphic system 360, the sound system 370, etc. For example, when the operating system is executed, the CPU 351 initializes the video game apparatus 301 in its entirety for confirming its operation, and thereafter controls the optical disc controller 380 to execute an application program recorded in the optical disk. As the application program is executed, the CPU 351 controls the graphic system 360, the sound system 370, etc. depending on instructions entered from the user for thereby controlling the display of images and the generation of music sounds and sound effects.

The CPU 351 corresponds to the CPU 42 of the video game machine 5, and restores data selectively received and sent by the portable electronic device 400.

The graphic system 360 serves the function of the graphic processor 46 of the video game machine 5. The graphic system 360 comprises a geometry transfer engine (GTE) 361 for performing coordinate transformations and other processing, a GPU 362 for plotting image data according to commands from the CPU 351, a frame buffer 363 for storing image data plotted by the GPU 362, and an image decoder 364 for decoding image data compressed and encoded by an orthogonal transform such as a discrete cosine transform.

The GTE 361 has a parallel arithmetic mechanism for performing a plurality of arithmetic operations parallel to each other, and can perform coordinate transformations, light source calculations, matrixes, or vectors at a high speed in response to a request from the CPU 351. Specifically, the GTE 361 can calculate the coordinates of a maximum of 1.5 million polygons per second for a flat shading process to plot one triangular polygon with one color, for example. With the GTE 361, the video game apparatus 301 is able to reduce the burden on the CPU 351 and perform highspeed coordinate calculations.

According to an image plotting command from the CPU 351, the GPU 362 plots a polygon or the like in the frame buffer 363. The GPU 362 is capable of plotting a maximum of 360 thousand polygons per second.

The frame buffer 363 comprises a dual-port RAM, and is capable of simultaneously storing image data plotted by the GPU 362 or image data transferred from the main memory 353, and reading image data for display. The frame buffer 363 has a storage capacity of 1 Mbytes, for example, and is handled as a 16-bit matrix made up of a horizontal row of 1024 pixels and a vertical column of 512 pixels.

The frame buffer 363 has a display area for storing image data to be outputted as video output data, a CLUT (color look-up table) area for storing a color look-up table which will be referred to by the GPU 362 when it plots a polygon or the like, and a texture area for storing texture data to be subjected to coordinate transformations when a polygon is plotted and mapped onto a polygon plotted by the GPU 362. The CLUT area and the texture area are dynamically varied as the display area is varied.

The image decoder 364 is controlled by the CPU 351 to decode image data of a still or moving image stored in the main memory 353, and store the decoded image into the main memory 353. Image data reproduced by the image decoder 364 is transferred to the frame buffer 363 by the GPU 362, and can be used as a background for an image plotted by the GPU 362.

The sound system 370 comprises an SPU 371 for generating music sounds, sound effects, etc. based on commands from the CPU 351, a sound buffer 372 for storing waveform data from the SPU 371, and a speaker 373 for outputting music sounds, sound effects, etc. generated by the SPU 371.

The SPU 371 has an ADPCM (adaptive differential PCM) function for reproducing 16-bit sound data which has been encoded as 4-bit differential sound data by ADPCM, a reproducing function for reproducing the waveform data stored in the sound buffer 372 to generate sound effects, etc., and a modulating function for modulating and reproducing the waveform data stored in the sound buffer 372.

The sound system 370 can be used as a sampling sound source which generates music sounds, sound effects, etc. based on the waveform data stored in the sound buffer 372 according to commands from the CPU 351.

The optical disk controller 380 comprises an optical disk drive 381 for reproducing application programs and data recorded on an optical disk such as a CD-ROM or the like, a decoder 382 for decoding programs and data that are recorded with an error correcting code added thereto, and a buffer 383 for temporarily storing data read from the optical disk drive 381 so as to allow the data from the optical disk to be read at a high speed. An auxiliary CPU 384 is connected to the decoder 382.

Sound data recorded on the optical disk which is read by the optical disk drive 381 includes PCM data converted from analog sound signals, in addition to the ADPCM data. The ADPCM data, which is recorded as 4-bit differential data of 16-bit digital data, is decoded by the decoder 382, supplied to the SPU 371, converted thereby into analog data, and applied to drive the speaker 373. The PCM data, which is recorded as 16-bit digital data, is decoded by the decoder 382 and then applied to drive the speaker 373.

The communication controller 390 comprises a communication control mechanism 391 for controlling communication with the CPU 351 via the bus 395, a controller connector 309 to which the manual controller 320 for entering instructions from the user is connected, and a pair of memory card insertion units 308A, 308B (see also FIG. 22) for receiving the memory card 500 as an auxiliary memory device for storing game settings, etc. and the portable electronic device 400, the memory card insertion units 308A, 308B being controlled by the communication control mechanism 391.

The video game apparatus 301 thus constructed has the same function as the video game machine 5 described above.

Specifically, the video game apparatus 301 stores received data sent from the portable electronic device 400 via the communication controller 391 into the main memory 353. The video game apparatus 301 combines data strings to restore the sent data based on sequence codes in the received data.

For example, the video game apparatus 301 uses the sent data thus restored for the application program executed thereby, and sends the data to the portable electronic device 400.

As shown in FIG. 27, the portable electronic device 400 comprises a control means 441, an apparatus connection connector 442, an input means 443, a display means 444, a clock function unit 445, a nonvolatile memory 446, a speaker 447, a wireless communication means 448 and a radio reception means 449 as a data transmitting/receiving means, a battery 450, and a power supply terminal 451 and a diode 452 as a power supply means.

The control means 441 comprises a microcomputer, for example. The control means 441 is arranged to serve the function of the CPU 22 of the portable computer 4. The control means 441 has a program memory 441*a* disposed therein as a program storage means.

The apparatus connection connector 442 serves as a connection means for connecting to a slot of another information-handling apparatus or the like.

The input means 443 serve as the input block 24 of the portable computer 4, and comprises control buttons for controlling a program stored in the program memory 441*a*.

The display means 444 serves as the display block 27 of the portable computer 4. The display means 444 comprises a liquid crystal display unit or the like for displaying various items of information.

The clock function unit 445 is arranged to display time on the display means 444, for example.

The nonvolatile memory 446 serves to store various data. For example, the nonvolatile memory 446 comprises a semiconductor memory such as a flash memory which is capable of retaining stored data even when the portable electronic device 400 is turned off.

Since the portable electronic device 400 has the battery 450, the nonvolatile memory 446 may comprise a static random-access memory (SRAM) capable of storing and reading data at a high speed.

The nonvolatile memory 446 corresponds to the nonvolatile memory 26 of the portable computer 4, and serves to store received data selectively received by the portable electronic device 400.

The battery 450 also allows the portable electronic device 400 to be operable independently even when the portable electronic device 400 is removed from the slots 307A, 307B in the casing 302 of the video game apparatus 301.

The battery 450 comprises a chargeable secondary battery, for example. When the portable electronic device 400 is inserted in either one of the slots 307A, 307B in the casing 302 of the video game apparatus 301, the battery 450 is supplied with electric energy from the video game apparatus 301. Specifically, the battery 450 has a terminal connected to the power supply terminal 450 via a reverse-current prevention diode 451. When the portable electronic device 400 is connected to the casing 302, electric energy is supplied from the power supply terminal 450 via the reverse-current prevention diode 451 to the battery 450.

The wireless communication means 448 is arranged to perform data communication with another memory card or the like through an infrared radiation or the like.

The radio reception means 449 corresponds to the assembly of the antenna 11 and the radio reception block 21 of the portable computer 4, and is arranged to receive various data transmitted by a radio broadcast.

The speaker 447 is constructed as a sound generating means for generating sounds according to a program.

The above components or means of the portable electronic device 400 are connected to the control means 441, and are operated under the control of the control means 441.

FIG. 28 shows control items of the control means 441. As shown in FIG. 28, the control means 441 has an apparatus connection interface for connection to an information-handling apparatus, a memory interface for outputting data to and inputting data from a memory, a display interface, a control input interface, a sound interface, a wireless communication interface, a clock management interface, and a program download interface.

The portable electronic device 400, which has the input means 443 such as button switches for controlling a program to be executed and the display means 444 such as a liquid crystal display (LCD) unit, also serves as a portable game device when a game application is executed.

The portable electronic device 400 has a function to download an application program from the video game apparatus 301 and store the downloaded application program into the program memory 441*a* in the microcomputer 441. With such a function, it is possible to change application programs and various driver software that operate on the portable electronic device 400.

The portable electronic device 400 thus constructed has the same function as the portable computer 4.

Specifically, the radio reception means 449 receives divided data, produced by dividing data to be sent, broadcast from the broadcasting base station. Based on identification codes sent by the video game apparatus 301, the portable electronic device 400 selectively receives received data temporarily stored in the radio reception means 449, and stores the selectively received data into the nonvolatile memory 446. The stored data are sent to the video game apparatus 301 via the apparatus connection connector 442.

The video entertainment system, which is a specific arrangement of the portable computer 4 and the video game machine according to the present invention, has been described above.

The receiving system 3 which comprises the portable computer 4 and the video game machine 5 selectively receives divided data of a large amount of data sent from the broadcasting base station for thereby receiving the large amount of data, and can also serves the function of the video entertainment system. The received large amount of data can be reflected in the use of the video entertainment system, i.e., in the execution of the game application program.

An apparatus for receiving information according to the present invention is arranged to receive divided data, which are produced by dividing data to be sent in terms of data transmission units, allotted to data transmission cycles and sent, with added sequence information according to the sequence of the divided data and added identification information for identifying the data to be sent, and restores the sent data based on the sequence information and the identification information added to the divided data. Therefore, the apparatus for receiving information restores the sent data based on the sequence information and the identification information added to the divided data that are allotted to data transmission cycles and sent.

The apparatus for receiving information thus makes it possible to send and receive a large amount of data of one type at one time.

In a method of receiving information according to the present invention, to divided data, which are produced by dividing data to be sent in terms of data transmission units, there are added sequence information according to the sequence of divisions and identification information for identifying the data to be sent. The sent data are restored on the basis of the sequence information and the identification information added to the divided data that are allotted to data transmission cycles and sent.

The method of receiving information thus makes it possible to send and receive a large amount of data of one type at one time.

A system for receiving information according to the present invention has a second processing means for selectively receiving divided data, which are produced by dividing data to be sent in terms of data transmission units, allotted to data transmission cycles and sent, with added sequence information according to the sequence of divisions and added identification information for identifying the data to be sent, based on the identification information added to the divided data, and restoring the sent data based on the sequence information added to the divided data as selectively received. Therefore, the second processing means can restore the sent data based on the sequence information added to the divided data as selectively received.

The system for receiving information thus makes it possible to send and receive a large amount of data of one type at one time.

An apparatus for sending information according to the present invention comprises a data dividing means for dividing data to be sent in terms of data transmission units to produce divided data, an identification information adding means for adding identification information for identifying the data to be sent to the divided data, a sequence information adding means for adding sequence information to the divided data according to the sequence of the divided data, and a transmission processing means for allotting the divided data to data transmission cycles and sending the divided data. To the divided data produced when the data dividing means divides the data to be sent in terms of data transmission units, there are added identification information and sequence information by the identification information adding means and the sequence information adding means. The transmission processing means allots the divided data to data transmission cycles and sends the divided data.

The apparatus for sending information thus makes it possible to send and receive a large amount of data of one type at one time.

A method of sending information according to the present invention comprises the steps of dividing data to be sent in terms of data transmission units to produce divided data, adding identification information for identifying the data to be sent to the divided data, adding sequence information to the divided data according to the sequence of the divided data, and allotting the divided data to data transmission cycles and sending the divided data. To the divided data produced when the data dividing step divides the data to be sent in terms of data transmission units, there are added identification information and sequence information by the identification information adding step and the sequence information adding step. The allotting and sending step allots the divided data to data transmission cycles and sends the divided data.

The method of sending information thus makes it possible to send and receive a large amount of data of one type at one time.

A system for sending and receiving information according to the present invention includes a sending means comprising a data dividing means for dividing data to be sent in terms of data transmission units to produce divided data, an identification information adding means for adding identification information for identifying the data to be sent to the divided data, a sequence information adding means for adding sequence information to the divided data according to the sequence of the divided data, and a transmission processing means for allotting the divided data to data transmission cycles and sending the divided data. The system for sending and receiving information also includes a receiving means for restoring the sent data based on the identification information and the sequence information added to the divided data sent from the sending means.

With the above arrangement, in the sending means of the system for sending and receiving information, to the divided data produced when the data dividing means divides the data to be sent in terms of data transmission units, there are added identification information and sequence information by the identification information adding means and the sequence information adding means. The transmission processing means allots the divided data to data transmission cycles and sends the divided data. The receiving means restores the sent data based on the identification information and the sequence information added to the divided data sent from the sending means.

The system for sending and receiving information thus makes it possible to send and receive a large amount of data of one type at one time.

A system for sending and receiving information according to the present invention includes a sending means comprising a data dividing means for dividing data to be sent in terms of data transmission units to produce divided data, an identification information adding means for adding identification information for identifying the data to be sent to the divided data, a sequence information adding means for adding sequence information to the divided data according to the sequence of the divided data, and a transmission processing means for allotting the divided data to data transmission cycles and sending the divided data. The system for sending and receiving information also includes a receiving means for selectively receiving the divided data based on the identification information added thereto with a second data processing means, and restoring the sent data based on the sequence information added to the divided data as selectively received.

With the above arrangement, in the sending means of the system for sending and receiving information, to the divided data produced when the data dividing means divides the data to be sent in terms of data transmission units, there are added identification information and sequence information by the identification information adding means and the sequence information adding means. The transmission processing means allots the divided data to data transmission cycles and sends the divided data. The receiving means selectively receives the divided data based on the identification information added thereto with a second data processing means, and restores the sent data based on the sequence information added to the divided data as selectively received.

The system for sending and receiving information thus makes it possible to send and receive a large amount of data of one type at one time.

Although a certain preferred embodiment of the present invention has been shown and described in detail, it should be understood that various changes and modifications may be made therein without departing from the scope of the appended claims.

What is claimed is:

1. An apparatus for receiving information by receiving divided data ($D_X$), which are produced by dividing data to be sent in terms of data transmission units, allotted to data transmission cycles and sent, with added sequence information ($D_n$) according to the sequence of the divided data and added identification information ($D_F$) for identifying the data to be sent, comprising:

means for comparing identification information preset for selective reception with the identification information added to the divided data;

means for selectively receiving the divided data based on a compared result form said comparing means; and means for restoring the divided data based on the sequence information added to the divided data.

2. An apparatus according to claim 1, wherein total-number-of-divisions information is added to each of the divided data which are sent, the arrangement being such that information indicating that all the divided data for restoring the sent data are received is acquired based on said total-number-of-divisions information.

3. An apparatus according to claim 1, wherein said divided data are allotted respectively to a plurality of data transmission cycles and sent.

4. An apparatus according to claim 1, for use as a portable information communication terminal.

5. A method of receiving information by receiving divided data ($D_X$), which are produced by dividing data to be sent in terms of data transmission units, allotted to data transmission cycles and sent, with added sequence information ($D_n$) according to the sequence of the divided data and added identification information ($D_F$) for identifying the data to be sent, comprising the steps of:

comparing identification information preset for selective reception with the identification information added to the divided data;

selectively receiving the divided data based on a compared result from said comparing step; and restoring the divided data based on the sequence information added to the divided data.

6. A system for receiving information, comprising:

first data processing means for processing data; and second data processing means removably connectable to said first data processing means, for performing data communications with said first data processing means;

said second data processing means comprising means for selectively receiving divided data, which are produced by dividing data to be sent in terms of data transmission units, allotted to data transmission cycles and sent, with added sequence information according to the sequence of the divided data and added identification information for identifying the data to be sent, based on said identification information added to said divided data;

said first data processing means comprising means for restoring the sent data based on said sequence information added to the divided data as selectively received.

7. A system according to claim 6, wherein said second data processing means comprises:

comparing means for comparing identification information preset for selective reception with the identification information added to said divided data; and selective reception means for selectively receiving the divided data based on a compared result from said comparing means.

8. A system according to claim 7, wherein said first data processing means comprises means for presetting the identification information for selective reception.

9. A system according to claim 6, wherein total-number-of-divisions information is added to each of the divided data which are sent, said second data processing means comprising means for acquiring information indicating that all the divided data for restoring the sent data are received, based on said total-number-of-divisions information.

10. A system according to claim 6, wherein said first data processing means comprises means for restoring the sent data based on said sequence information added to the divided data selectively received by said second data processing means.

11. A system according to claim 10, wherein the sent data restored by said first data processing means are sent to said second data processing means.

12. A system according to claim 10, wherein said first data processing means comprises:

communication means for receiving the divided data selectively received by said second data processing means; and restoring means for restoring the sent data based on said sequence information added to the divided data.

13. A system according to claim 6, wherein said divided data are allotted respectively to a plurality of data transmission cycles and sent.

14. A system according to claim 6, wherein said first data processing means comprises a video entertainment apparatus, and said second data processing means comprises a portable information communication terminal.

15. An apparatus for sending information, comprising:

data dividing means for dividing data to be sent in terms of data transmission units to produce divided data;

identification information adding means for adding means for adding identification information for identifying the data to be sent to the divided data;

sequence information adding means for adding sequence information to the divided data according to the sequence of the divided data; and transmission processing means for allotting the divided data to data transmission cycles and sending the divided data, wherein the divided data are selectively received by comparing identification information preset for selective reception with the identification information added to the divided data, and the selectively received divided data is restored based on the sequence information added to the divided data.

16. An apparatus according to claim 15, further comprising:

total-number-of-divisions information adding means for adding total-number-of-divisions information to each of said divided data.

17. An apparatus according to claim 15, wherein said divided data are allotted respectively to a plurality of data transmission cycles and sent.

18. A method of sending information, comprising the steps of:

dividing data to be sent in terms of data transmission units to produce divided data;

adding identification information for identifying the data to be sent to the divided data;

adding sequence information to the divided data according to the sequence of the divided data; and allocating the divided data to data transmission cycles and sending the divided data, wherein the divided data are selectively received by comparing identification information preset for selective reception with the identification information added to the divided data, and the selectively received divided data is restored based on the sequence information added to the divided data.

19. A system for sending and receiving information, comprising:

sending means comprising data dividing means for dividing data to be sent in terms of data transmission units to produce divided data, identification information adding means for adding identification information for identifying the data to be sent to the divided data, sequence information adding means for adding sequence information to the divided data according to the sequence of the divided data, and transmission processing means for allotting the divided data to data transmission cycles and sending the divided data; and receiving means for restoring the sent data based on the identification information and the sequence information added to the divided data sent from the sending means.

20. A system according to claim 19, wherein said receiving means comprises:

selective reception means for selectively receiving said divided data based on said identification information; and restoring means for restoring the sent data based on the sequence information added to the divided data as selectively received.

21. A system for sending and receiving information, comprising sending means for sending data and receiving means for receiving the data sent by said sending means, said receiving means comprising first data processing means for processing data and second data processing means removably connectable to said first data processing means, for performing data communications with said first data processing means;

said sending means comprising:

data dividing means for dividing data to be sent in terms of data transmission units to produce divided data, identification information adding means for adding identification information for identifying the data to be sent to the divided data, sequence information adding means for adding sequence information to the divided data according to the sequence of the divided data, and transmission processing means for allotting the divided data to data transmission cycles and sending the divided data; and said second data processing means comprising means for selectively receives the divided data based on the identification information added thereto;

said receiving means comprising means for restoring the sent data based on the sequence information added to the divided data as selectively received.

22. A system according to claim 21, wherein said second data processing means comprises:

comparing means for comparing identification information preset for selective reception with the identification information added to said divided data; and selective reception means for selectively receiving the divided data based on a compared result from said comparing means.

23. A system according to claim 21, wherein said first data processing mean comprises means for presetting the identification information preset for selective reception.

* * * * *